US012634747B2

(12) United States Patent  
Jha et al.

(10) Patent No.: US 12,634,747 B2  
(45) Date of Patent: May 19, 2026

(54) INTELLIGENT TRANSPORT SYSTEM CONGESTION AND MULTI-CHANNEL CONTROL

(71) Applicant: Intel Corporation, Santa Clara, CA (US)

(72) Inventors: Satish C. Jha, Portland, OR (US); Vesh Raj Sharma Banjade, Portland, OR (US); Kathiravetpillai Sivanesan, Portland, OR (US); Leonardo Gomes Baltar, Munich (DE); Suman A. Sehra, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 17/551,871

(22) Filed: Dec. 15, 2021

(65) Prior Publication Data

US 2022/0110018 A1    Apr. 7, 2022

Related U.S. Application Data

(60) Provisional application No. 63/181,775, filed on Apr. 29, 2021, provisional application No. 63/181,806, filed on Apr. 29, 2021.

(51) Int. Cl.  
*H04W 28/02* (2009.01)  
*H04W 4/40* (2018.01)  
(Continued)

(52) U.S. Cl.  
CPC ......... *H04W 28/0289* (2013.01); *H04W 4/40* (2018.02); *H04W 28/082* (2023.05);  
(Continued)

(58) Field of Classification Search  
CPC ........... H04W 28/0289; H04W 72/569; H04W 74/0816; H04L 25/0204; H04L 27/2647;  
(Continued)

(56) References Cited

U.S. PATENT DOCUMENTS

2019/0297526 A1* 9/2019 Das ................... H04W 28/0284  
2020/0160694 A1* 5/2020 Jornod ................. G08G 1/0141  
(Continued)

OTHER PUBLICATIONS

"Commission Decision of Aug. 5, 2008—on the harmonised use of radio spectrum in the 5 875-5 905 MHz frequency band for safety-related applications of Intelligent Transport Systems (ITS)", Official Journal of the European Union, Aug. 15, 2008, 3 pages.  
(Continued)

*Primary Examiner* — Iqbal Zaidi  
(74) *Attorney, Agent, or Firm* — Essential Patents Group, LLP; Christopher K. Gagne

(57) ABSTRACT

The present disclosure provides techniques or mechanisms to reduce congestion or improve efficiency of intelligent transport system (ITS) congestion and multi-channel control. Some embodiments relate to multi-channel transmission of ITS-related service messages. Some embodiments relate to use of a freshness factor in scheduling ITS transmissions. Other embodiments may be described or claimed.

14 Claims, 15 Drawing Sheets

(51) Int. Cl.
*H04W 28/082* (2023.01)
*H04W 48/06* (2009.01)
*H04W 72/566* (2023.01)
*H04W 74/0816* (2024.01)

(52) U.S. Cl.
CPC ....... *H04W 48/06* (2013.01); *H04W 74/0816* (2013.01); *H04W 72/569* (2023.01)

(58) Field of Classification Search
CPC ............. H04L 25/0212; H04L 27/2613; H04L 25/03019; H04L 5/0007; H04L 5/0028; H04L 2025/0377
See application file for complete search history.

(56) References Cited

U.S. PATENT DOCUMENTS

| | | | | |
|---|---|---|---|---|
| 2020/0296795 | A1* | 9/2020 | Uchiyama | H04B 7/15528 |
| 2020/0344643 | A1* | 10/2020 | Zhou | H04W 4/80 |
| 2022/0217568 | A1* | 7/2022 | Mach | H04W 36/037 |
| 2022/0386169 | A1* | 12/2022 | Llatser Marti | H04W 8/04 |
| 2023/0262842 | A1* | 8/2023 | Uchiyama | H04L 1/1825 |
| | | | | 370/329 |

OTHER PUBLICATIONS

ETSI, "Intelligent Transport Systems (ITS); Radiocommunications equipment operating in the 5 855 MHz to 5 925 MHZ frequency band; Harmonised Standard covering the essential requirements of article 3.2 of Directive 2014/53/EU", Draft ETSI EN 302 571 v2.0.0, Mar. 2016, 45 pages, France.

ETSI, "Intelligent Transport Systems (ITS); Radiocommunications equipment operating in the 5 855 MHz to 5 925 MHZ frequency band; Harmonised Standard covering the essential requirements of article 3.2 of Directive 2014/53/EU", ETSI EN 302 571 V2.1.1, Feb. 2017, 49 pages, France.

ETSI, "Intelligent Transport Systems (ITS); Communications Architecture", Final draft ETSI EN 302 665 V1.1.0, Jul. 2010, 44 pages, France.

ETSI, "Intelligent Transport Systems (ITS); Facilities layer function; Part 1: Services Announcement (SA) specification". ETSI EN 302 890-1 V1.2.1, Jul. 2019, 19 pages, France.

Miguel Sepulcre et al., "Heterogeneous V2V Communications in Multi-Link and Multi-RAT Vehicular Networks", IEEE Transactions on Mobile Computing, vol. 20, No. 1, Jan. 2021, 12 pages.

Mohammad Irfan Khan et al., "In Vehicle Resource Orchestration for Multi-V2X Services", IEEE 2019, 5 pages.

ETSI, "Intelligent Transport System (ITS); Communication Architecture for Multi-Channel Operation (MCO); Release 2", ETSI TS 103 696 V0.0.7, Oct. 2021, 21 pages, France.

ETSI, "Intelligent Transport Systems (ITS); Multi-Channel Operation study; Release 2", ETSI TR 103 439 V2.1.1, Oct. 2021, 143 pages, France.

ETSI, "Intelligent Transport Systems (ITS); Facilities layer; Communication congestion control; Release 2", ETSI TS 103 141 V2.1.1, Nov. 2021, 18 pages, France.

* cited by examiner

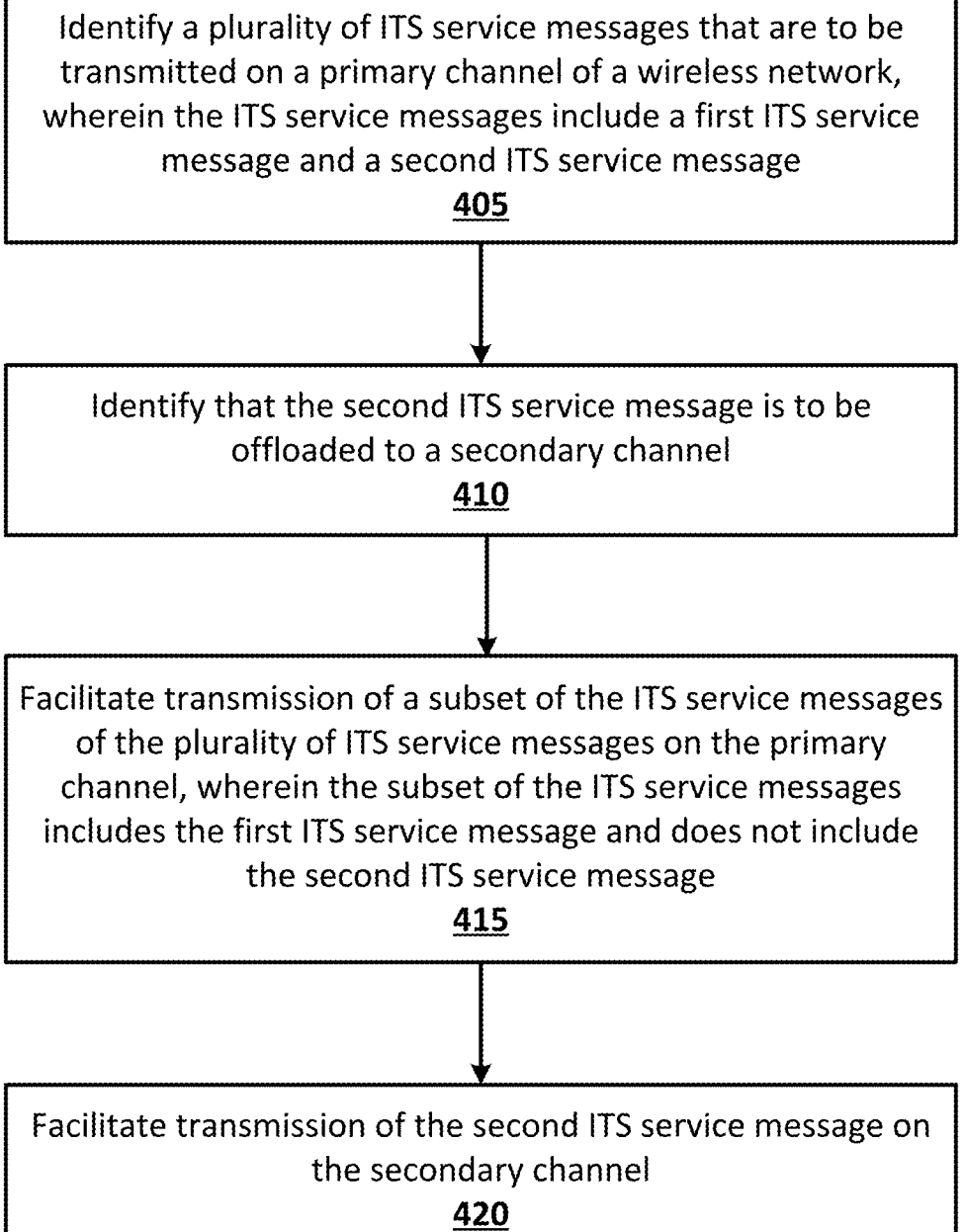

Identify a plurality of ITS service messages that are to be transmitted on a primary channel of a wireless network, wherein the ITS service messages include a first ITS service message and a second ITS service message
405

Identify that the second ITS service message is to be offloaded to a secondary channel
410

Facilitate transmission of a subset of the ITS service messages of the plurality of ITS service messages on the primary channel, wherein the subset of the ITS service messages includes the first ITS service message and does not include the second ITS service message
415

Facilitate transmission of the second ITS service message on the secondary channel
420

Figure 4

For each radio (sub) channel, each service j given traffic class l, compute the SSF for the service j
605

Identify the scheduling share for service j, Sj
610

Identify channel resource (CR) score for the service j, CRj
615

Identify net resource at time t for service j, Nj(t)
620

Schedule services based on Nj(t)
625

800

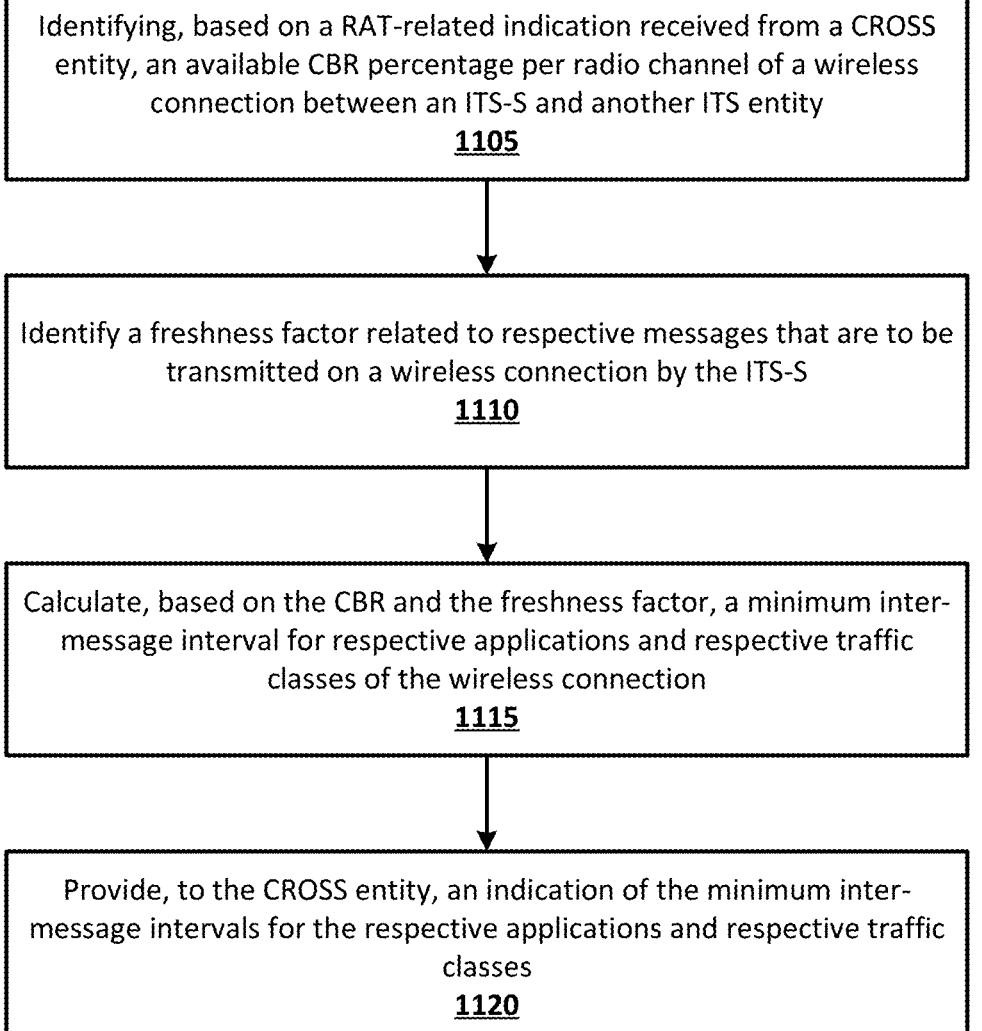

Identifying, based on a RAT-related indication received from a CROSS entity, an available CBR percentage per radio channel of a wireless connection between an ITS-S and another ITS entity
1105

Identify a freshness factor related to respective messages that are to be transmitted on a wireless connection by the ITS-S
1110

Calculate, based on the CBR and the freshness factor, a minimum inter-message interval for respective applications and respective traffic classes of the wireless connection
1115

Provide, to the CROSS entity, an indication of the minimum inter-message intervals for the respective applications and respective traffic classes
1120

Figure 11

1350 processor 1352
instructions 1381 trusted execution environment 1390

1360
memory 1354
instructions 1382 storage 1358
instructions 1383 output circuitry 1384 input circuitry 1386

1356
acceleration circuitry 1364

1366
1366y
1366x
1366z network interface 1368 external interface 1370 battery 1376 battery monitor / charger 1378 edge devices 1362 edge cloud 1363 sensors 1372 actuators 1374 pos 1375 power block 1380

INTELLIGENT TRANSPORT SYSTEM CONGESTION AND MULTI-CHANNEL CONTROL

RELATED APPLICATIONS

The present disclosure claims priority to U.S. Provisional App. No. 63/181,806, filed on Apr. 29, 2021, and U.S. Provisional App. No. 63/181,775, filed on Apr. 29, 2021, the contents of which are hereby incorporated by reference in their entirety.

TECHNICAL FIELD

The present disclosure is generally related to edge computing, cloud computing, network communication, data centers, network topologies, and communication system implementations, and in particular, to intelligent transport system (ITS) congestion and multi-channel control.

BACKGROUND

As ITS environments grow, an increasing number of ITS-stations (ITS-S) may be present in the environment. Additionally, an increasing number of messages (e.g., ITS service messages) may be transmitted from the increasing number of ITS-Ss. As such, congestion of the ITS environment may become an increasing problem, as such congestion may decrease the efficiency of communication to or from the various ITS-Ss.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 depicts an example technique to be performed by an ITS-S architecture, in accordance with various embodiments.

FIG. 11 depicts an alternative example technique to be performed by an ITS-S architecture, in accordance with various embodiments.

DETAILED DESCRIPTION

The following embodiments generally relate to techniques by which communication efficiency of an ITS environment may be increased. Specifically, in one embodiments ITS-related service messages may be transmitted on a primary channel. If the bandwidth required to transfer the ITS-related service messages exceeds the available bandwidth of the primary channel at a given point in time, then certain of the ITS-related service messages may be offloaded to a secondary channel. In another embodiment, a freshness factor may be applied to various messages. The freshness factor may be used by a scheduling entity to identify which messages should be prioritized for transmission.

1. ITS Configurations and Arrangements

Figure 1:
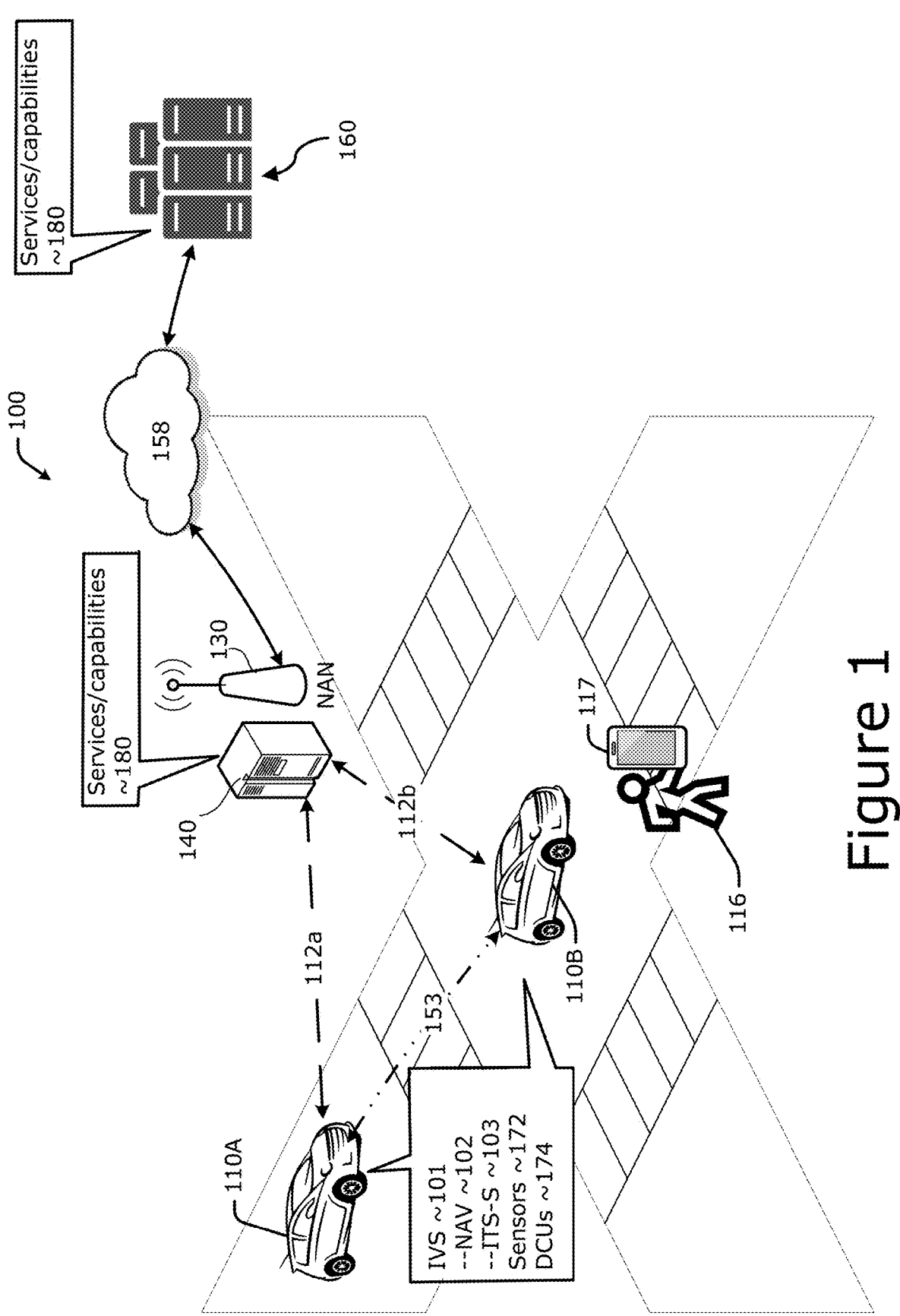
FIG. 1 illustrates an operative ITS environment, in accordance with various embodiments.

FIG. 1 illustrates an overview of an environment 100, which includes vehicles 110A and 110B (collectively "vehicle 110"). Vehicles 110 includes an engine, transmission, axles, wheels and so forth (not shown). The vehicles 110 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 110 shown by FIG. 1 may represent motor vehicles of varying makes, models, trim, etc.

For illustrative purposes, the following description is provided for deployment scenarios including vehicles 110 in a 2D freeway/highway/roadway environment wherein the vehicles 110 are automobiles. However, other types of vehicles are also applicable, such as trucks, busses, motorboats, motorcycles, electric personal transporters, and/or any other motorized devices capable of transporting people or goods. 3D deployment scenarios are also applicable where some or all of the vehicles 110 are implemented as flying objects, such as aircraft, drones, UAVs, and/or to any other like motorized devices.

For illustrative purposes, the following description is provided where the vehicles 110 include in-vehicle systems (IVS) 101, which are discussed in more detail infra. However, the vehicles 110 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the functionality discussed herein. Vehicles 110 including a computing system (e.g., IVS 101) as well as the vehicles referenced throughout the present disclosure, may be referred to as vehicle user equipment (vUE) 110, vehicle stations 110, vehicle ITS-stations (V-ITS-S) 110, computer assisted/autonomous driving (CA/AD) vehicles 110, and/or the like.

Each vehicle 110 includes an in-vehicle system (IVS) 101, one or more sensors 172, and one or more driving control units (DCUs) 174. The IVS 100 includes a number of vehicle computing hardware subsystems and/or applications including, for example, various hardware and software elements to implement the ITS architecture. The vehicles 110 may employ one or more V2X RATs, which allow the vehicles 110 to communicate directly with one another and with infrastructure equipment (e.g., network access node (NAN) 130). The V2X RATs may refer to 3GPP cellular V2X RAT (e.g., long term evolution (LTE), 5G/new radio (NR), and beyond), a wireless local area network (WLAN) V2X (W-V2X) RAT (e.g., Dedicated Short Range Communication (DSRC) in the USA or ITS-G5 in the EU), and/or some other RAT such as those discussed herein. Some or all of the vehicles 110 may include positioning circuitry to (coarsely) determine their respective geolocations and communicate their current position with the NAN 130 in a secure and reliable manner. This allows the vehicles 110 to synchronize with one another and/or the NAN 130. Additionally, some or all of the vehicles 110 may be computer-assisted or autonomous driving (CA/AD) vehicles, which may include artificial intelligence (AI) and/or robotics to assist vehicle operation.

The IVS 101 includes the ITS-S 103. The IVS 101 may be, or may include, Upgradeable Vehicular Compute Systems (UVCS). As discussed herein, the ITS-S 103 (or the underlying V2X RAT circuitry on which the ITS-S 103 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

The IVS 101 and CA/AD vehicle 110 may be any one of a number of in-vehicle systems and CA/AD vehicles, from computer-assisted to partially or fully autonomous vehicles. Additionally, the IVS 101 and CA/AD vehicle 110 may include other components/subsystems not shown by FIG. 1 such as the elements shown and described throughout the present disclosure. These and other elements of the underlying technology used to implement IVS 101 will be further described infra.

In addition to the functionality discussed herein, the ITS-S 103 (or the underlying V2X RAT circuitry on which the ITS-S 103 operates) is capable of measuring various signals or determining/identifying various signal/channel characteristics. Signal measurement may be performed for cell selection, handover, network attachment, testing, and/or other purposes. The measurements/characteristics collected by the ITS-S 103 (or V2X RAT circuitry) may include one or more of the following: The radio information may be in the form of one or more measurement reports, and/or may include, for example, signal strength measurements, signal quality measurements, and/or the like. Each measurement report is tagged with a timestamp and the location of the measurement (e.g., the ITS-S 103 current location). As examples, the measurements collected by the ITS-S 103 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/NO), energy per bit to interference power density ratio (Ec/IO), peak-to-average power ratio (PAPR), Reference Signal Received Power (RSRP), Received Signal Strength Indicator (RSSI), Reference Signal Received Quality (RSRQ), global navigation satellite system (GNSS) timing of cell frames for user equipment (UE) positioning for E-UTRAN or 5G/NR (e.g., a timing between an access point (AP) or Radio Access Network (RAN) node reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for Institute of Electrical and Electronics Engineers (IEEE) 802.11 WLAN/WiFi networks. Other measurements may be additionally or alternatively used, such as those discussed In 3GPP Technical Specification (TS) 36.214 v16.2.0 (2021-03-31) ("[T536214]"), 3GPP TS 38.215 v16.4.0 (2020-12) ("[T538215]"), IEEE 802.11-2020, "IEEE Standard for Information Technology—Telecommunications and Information Exchange between Systems—Local and Metropolitan Area Networks—Specific Requirements—Part 11: Wireless local area network (LAN) Medium Access Control (MAC) and Physical Layer (PHY) Specifications" (2021-02-26) ("[IEEE80211]"), and/or the like. Additionally or alternatively, any of the aforementioned measurements (or combination of measurements) may be collected by one or more NANs 130 and provided to the edge compute node(s) 140.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of Protocol Data Unit (PDU) sessions requested to setup; number of PDU sessions successfully setup; number of PDU sessions failed to setup, etc.); measurements related to GTP Management (GTP); measurements related to internet protocol (IP) Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR);

measurements related to Carrier (CARR); measurements related to QoS Flows (QF) (e.g., number of released active QoS flows, number of QoS flows attempted to release, in-session activity time for QoS flow, in-session activity time for a UE 110, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to network function (NF) service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements.

The radio information may be reported in response to a trigger event and/or on a periodic basis. Additionally or alternatively, individual UEs 110 report radio information either at a low periodicity or a high periodicity depending on a data transfer that is to take place, and/or other information about the data transfer. Additionally or alternatively, the edge compute node(s) 140 may request the measurements from the NANs 130 at low or high periodicity, or the NANs 130 may provide the measurements to the edge compute node(s) 140 at low or high periodicity. Additionally or alternatively, the edge compute node(s) 140 may obtain other relevant data from other edge compute node(s) 140, core NFs, application functions (AFs), and/or other UEs 110 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and Maneuver Coordination Service (MCS) measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, European telecommunications standards institute (ETSI) O-RAN, and/or any other like standards such as those discussed herein.

The subsystems/applications may also include instrument cluster subsystems, front-seat and/or back-seat infotainment subsystems and/or other like media subsystems, a navigation subsystem (NAV) 102, a vehicle status subsystem/application, a HUD subsystem, an EMA subsystem, and so forth. The NAV 102 may be configurable or operable to provide navigation guidance or control, depending on whether vehicle 110 is a computer-assisted vehicle, partially or fully autonomous driving vehicle. NAV 102 may be configured with computer vision to recognize stationary or moving objects (e.g., a pedestrian, another vehicle, or some other moving object) in an area surrounding vehicle 110, as it travels enroute to its destination. The NAV 102 may be configurable or operable to recognize stationary or moving objects in the area surrounding vehicle 110, and in response, make its decision in guiding or controlling DCUs of vehicle 110, based at least in part on sensor data collected by sensors 172.

The DCUs 174 include hardware elements that control various systems of the vehicles 110, such as the operation of the engine, the transmission, steering, braking, etc. DCUs 174 are embedded systems or other like computer devices that control a corresponding system of a vehicle 110. The DCUs 174 may each have the same or similar components as devices/systems of FIG. 13 74 discussed infra, or may be some other suitable microcontroller or other like processor device, memory device(s), communications interfaces, and the like. Individual DCUs 174 are capable of communicating with one or more sensors 172 and actuators (e.g., actuators 13 74 of FIG. 13).

The sensors 172 are hardware elements configurable or operable to detect an environment surrounding the vehicles 110 and/or changes in the environment. The sensors 172 are configurable or operable to provide various sensor data to the DCUs 174 and/or one or more AI agents to enable the DCUs 174 and/or one or more AI agents to control respective control systems of the vehicles 110. Some or all of the sensors 172 may be the same or similar as the sensor circuitry 13 72 of FIG. 13. In particular, the IVS 101 may include or implement a facilities layer and operate one or more facilities within the facilities layer.

The sensors 172 include(s) devices, modules, and/or subsystems whose purpose is to detect events or changes in its environment and send the information (sensor data) about the detected events to some other a device, module, subsystem, etc. Examples of such sensors 172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, some of the sensors 172 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/ orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 172 may include other sensors such as an accelerator pedal position sensor (APP), accelerometers, magnetometers, level sensors, flow/fluid sensors, barometric pressure sensors, and/or any other sensor(s) such as those discussed herein. Sensor data from sensors 172 of the host vehicle may include engine sensor data collected by various engine sensors (e.g., engine temperature, oil pressure, and so forth)

IVS 101, on its own or in response to user interactions, communicates or interacts with one or more vehicles 110 via interface 153, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, etc.). Other technologies could be used, such as Bluetooth/ Bluetooth Low Energy (BLE) or the like. The vehicles 110 may exchange ITS PDUs or other messages (e.g., VAMs, CPMs, etc.) with one another over the interface 153.

IVS 101, on its own or in response to user interactions, communicates or interacts with one or more remote/cloud servers 160 via NAN 130 over interface 112 and over network 158. The NAN 130 is arranged to provide network connectivity to the vehicles 110 via respective interfaces 112 between the NAN 130 and the individual vehicles 110. The NAN 130 is, or includes, an ITS-S, and may be a roadside ITS-S(R-ITS-S). The NAN 130 is a network element that is part of an access network that provides network connectivity to the end-user devices (e.g., V-ITS-Ss 110 and/or Vulnerable Road User (VRU) ITS-Ss 117). The access networks may be RANs such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. All or parts of the RAN may be implemented as one or more software entities running on server computers as part of a virtual network, which may be referred to as a cloud RAN (CRAN), Cognitive Radio, a virtual baseband unit pool (vBBUP), and/or the like. The CRAN, cognitive radio, or vBBUP may implement a RAN function split, wherein one or more communication protocol layers are operated by the CRAN/CR/vBBUP and other communication protocol entities are operated by individual RAN nodes 130. This virtualized framework allows the freed-up processor cores of the NAN 130 to perform other virtualized applications, such as virtualized applications for the VRU 116/V-ITS-S 110.

Environment 100 also includes VRU 116, which includes a VRU ITS-S 117. The VRU 116 is a non-motorized road users as well as L class of vehicles (e.g., mopeds, motorcycles, Segways, etc.), as defined in Annex I of Regulation (EU) No 168/2013 of the European Parliament and of the Council of 15 Jan. 2013 on the approval and market surveillance of two- or three-wheel vehicles and quadricycles ("EU regulation 168/2013") (see e.g., International Organization for Standardization (ISO) "Road vehicles—Vehicle dynamics and road-holding ability—Vocabulary", ISO, TC 22, SC 33, Ed. 2 (2011-12) ("[ISO-8855:2011]")). A VRU 116 is an actor that interacts with a VRU system 117 in a given use case and behavior scenario. For example, if the VRU 116 is equipped with a personal device, then the VRU 116 can directly interact via the personal device with other ITS-Stations and/or other VRUs 116 having VRU devices 117. The VRU ITS-S 117 could be either pedestrian-type VRU or vehicle-type (on bicycle, motorbike) VRU. The term "VRU ITS-S" as used herein refers to any type of VRU device or VRU system. Before the potential VRU 116 can even be identified as a VRU 116, it may be referred to as a non-VRU and considered to be in IDLE state or inactive state in the ITS.

If the VRU 116 is not equipped with a device, then the VRU 116 interacts indirectly, as the VRU 116 is detected by another ITS-Station in the VRU system 117 via its sensing devices such as sensors and/or other components. However, such VRUs 116 cannot detect other VRUs 116 (e.g., a bicycle). In ETSI TS 103 300-2 V0.3.0 (2019-12) ("PS103300-21"), the different types of VRUs 116 have been categorized into the following four profiles: VRU Profile-1: Pedestrians (pavement users, children, pram, disabled persons, elderly, etc.); VRU Profile-2: Bicyclists (light vehicles carrying persons, wheelchair users, horses carrying riders, skaters, e-scooters, Segways, etc.); VRU Profile-3: Motorcyclists (motorbikes, powered two wheelers, mopeds, etc.); and VRU Profile-4: Animals posing safety risk to other road users (dogs, wild animals, horses, cows, sheep, etc.). These profiles further define the VRU functional system and communications architectures for VRU ITS-S 117. Furthermore, the VRU system 117 may have a VRU device type including VRU-Tx (VRU device 117 is equipped with transmitter only and can broadcast beacon messages about the VRU 116), VRU-Rx (VRU device 117 is equipped with a receiver only and application to receive message from other ITS-Ss and capable of warning/notifying the VRU 116), or VRU-St (VRU device 117 contains and ITS-S including both VRU-Tx and VRU-Rx capabilities).

A VRU 116 can be equipped with a portable device (e.g., device 117). The term "VRU" may be used to refer to both a VRU 116 and its VRU device 117 unless the context dictates otherwise. The VRU device 117 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 117) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, etc.) or an Internet of Things (IoT) device (e.g., traffic control devices) used by a VRU 116 integrating ITS-S technology, and as such, the VRU ITS-S 117 may include or refer to a "VRU device," "VRU equipment," and/or "VRU system".

The VRU systems considered in the present disclosure are Cooperative-ITS (C-ITS) that comprise at least one VRU and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010-09) ("[EN302665]")), related hardware components, other in-station services and sensor sub-systems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 117 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS-stations, for example cars, trucks, buses, road-side stations or central stations. These applications aim at providing VRU-relevant information to actors such as humans directly or to automated systems. VRU applications can increase the awareness of VRUs, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 117 including non-equipped VRUs (e.g., a VRU 116 not having a device); VRU-Tx (e.g., a VRU 116 equipped with an ITS-S 117 having only a transmission (Tx) but no reception (Rx) capabilities that broadcasts awareness messages or beacons about the VRU 116); VRU-Rx (e.g., a VRU 116 equipped with an ITS-S 117 having only an Rx (but no Tx) capabilities that receives broadcasted awareness messages or beacons about the other VRUs 116 or other non-VRU ITS-Ss); and VRU-St (e.g., a VRU 116 equipped with an ITS-S 117 that includes the VRU-Tx and VRU-Rx functionality). The use cases and behavior scenarios consider a wide set of configurations of VRU systems 117 based on the equipment of the VRU 116 and the presence or absence of V-ITS-S 110 and/or R-ITS-S 130 with a VRU application. Examples of the various VRU system configurations are shown by table 2 of ETSI TR 103 300-1 v2.1.1 (2019-09) ("[TR103300-1]").

The message specified for VRUs 116/117 is the VRU awareness message (VAM). VAMs are messages transmitted from VRU ITSs 117 to create and maintain awareness of VRUs 116 participating in the VRU/ITS system. VAMs are harmonized in the largest extent with the existing Cooperative Awareness Messages (CAM) defined in ETSI EN 302 637-2 V1.4.1 (2019-04) ("[EN302637-2]"). The transmission of the VAM is limited to the VRU profiles specified in clause 6.1 of [TS103300-2] The VAMs contain all required data depending on the VRU profile and the actual environmental conditions.

The VRU system 117 supports the flexible and dynamic triggering of messages with generation intervals from X milliseconds (ms) at the most frequent, where X is a number (e.g., X=100 ms). The VAMs frequency is related to the VRU motion dynamics and chosen collision risk metric as discussed in clause 6.5.10.5 of ETSI TS 103 300-3 V0.1.11 (2020-05) ("[TS103300-3]").

The Radio Access Technologies (RATs) employed by the NAN 130, the V-ITS-Ss 110, and the VRU ITS-S 117 may include one or more V2X RATs, which allow the V-ITS-Ss 110 to communicate directly with one another, with infrastructure equipment (e.g., NAN 130), and with VRU devices 117. In the example of FIG. 1, any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 112a and the WLAN V2X RAT may utilize an air interface 112b.

The W-V2X RATs include, for example, IEEE 1609.0-2019, "IEEE Guide for Wireless Access in Vehicular Environments (WAVE) Architecture" (2019-04-10) ("[IEEE16090]"), security adaptation entity (SAE) Intl, "V2X Communications Message Set Dictionary" (formerly "DSRC Message Set Dictionary") (2020-07-23) ("[J2735 202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture 200. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

In V2X scenarios, a V-ITS-Ss 110 or a NAN 130 may be or act as a Road Side Unites (RSU) or R-ITS-S 130, which refers to any transportation infrastructure entity used for V2X communications. In this example, the RSU 130 may be a stationary RSU, such as an gNB/eNB-type RSU or other like infrastructure, or relatively stationary UE. Additionally or alternatively, the RSU 130 may be a mobile RSU or a UE-type RSU, which may be implemented by a vehicle (e.g., V-ITS-Ss 110), pedestrian, or some other device with such capabilities. In these cases, mobility issues can be managed in order to ensure a proper radio coverage of the translation entities. Additionally or alternatively, RSU 130 may be a road embedded reflector, a smart street or traffic light, a road side tag, smart signage, or other like traffic control device/element.

The NAN 130 or an edge compute node 140 may provide one or more services/capabilities 180. In an example implementation, RSU 130 is a computing device coupled with radio frequency circuitry located on a roadside that provides connectivity support to passing V-ITS-Ss 110. The RSU 130 may also include internal data storage circuitry to store intersection map geometry, traffic statistics, media, as well as applications/software to sense and control ongoing vehicular and pedestrian traffic. The RSU 130 provides various services/capabilities 180 such as, for example, very low latency communications required for high-speed events, such as crash avoidance, traffic warnings, and the like. Additionally or alternatively, the RSU 130 may provide other services/capabilities 180 such as, for example, cellular/WLAN communications services. In some implementations, the components of the RSU 130 may be packaged in a weatherproof enclosure suitable for outdoor installation, and may include a network interface controller to provide a wired connection (e.g., Ethernet) to a traffic signal controller and/or a backhaul network. Further, RSU 130 may include wired or wireless interfaces to communicate with other RSUs 130 (not shown by FIG. 1)

In arrangement 100, V-ITS-S 110a may be equipped with a first V2X RAT communication system (e.g., C-V2X) whereas V-ITS-S 110b may be equipped with a second V2X RAT communication system (e.g., W-V2X which may be DSRC, ITS-G5, or the like). Additionally or alternatively, the V-ITS-S 110a and/or V-ITS-S 110b may each be employed with one or more V2X RAT communication systems. The RSU 130 may provide V2X RAT translation services among one or more services/capabilities 180 so that individual V-ITS-Ss 110 may communicate with one another even when the V-ITS-Ss 110 implement different V2X RATs, the RSU 130 (or edge compute node 140) may provide VRU services among the one or more services/capabilities 180 wherein the RSU 130 shares CPMs, MCMs, VAMs DENMs, CAMs, etc., with V-ITS-Ss 110 and/or VRUs for VRU safety purposes including RS S purposes. The V-ITS-Ss 110 may also share such messages with each other, with RSU 130, and/or with VRUs. These messages may include the various data elements and/or data fields as discussed herein.

In this example, the NAN 130 may be a stationary RSU, such as an gNB/eNB-type RSU or other like infrastructure. Additionally or alternatively, the NAN 130 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 130 that enables the connections 112 may be referred to as a "RAN node" or the like. The RAN node 130 may comprise ground stations (e.g., terrestrial access points) or satellite stations providing coverage within a geographic area (e.g., a cell). The RAN node 130 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 130 is embodied as a NodeB, evolved NodeB (eNB), or a next generation NodeB (gNB), one or more relay nodes, distributed units, or RSUs. Any other type of NANs can be used. Additionally, the RAN node 130 can fulfill various logical functions for the RAN including, but not limited to, RAN function(s) (e.g., radio network controller (RNC) functions and/or NG-RAN functions) for radio resource management, admission control, uplink and down-link dynamic resource allocation, radio bearer management, data packet scheduling, etc.

The network 158 may represent a network such as the Internet, a WLAN, or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 158 and/or access technologies may include cellular technology such as LTE, MuLTEfire, and/or NR/5G (e.g., as provided by RAN node 130), WLAN (e.g., WiFi®) technologies (e.g., as provided by an access point (AP) 130), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 160 may represent one or more application servers, a cloud computing architecture/platform that provides cloud computing services, and/or some other remote infrastructure. The remote/cloud servers 160 may include any one of a number of services and capabilities 180 such as, for example, ITS-related applications and services, driving assistance (e.g., mapping/navigation), content provision (e.g., multimedia infotainment streaming), and/or the like.

Additionally, the NAN 130 is co-located with an edge compute node 140 (or a collection of edge compute nodes 140), which may provide any number of services/capabilities 180 to vehicles 110 such as ITS services/applications, driving assistance, and/or content provision services 180. The edge compute node 140 may include or be part of an edge network or "edge-cloud." The edge compute node 140 may also be referred to as an "edge host 140," "edge server 140," or "compute platforms 140."

The edge compute nodes 140 may partition resources (e.g., memory, central processing unit (CPU), GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 140 may be implemented in a data center or cloud installation; a designated edge node server, an enterprise server, a roadside server, a telecom central office; or a local or peer at-the-edge device being served consuming edge services. The edge compute node 140 may provide any number of driving assistance and/or content provision services 180 to vehicles 110. The edge compute node 140 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 140 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the techniques herein.

1.1. Collective Perception Services (CPS)

Figure 2:
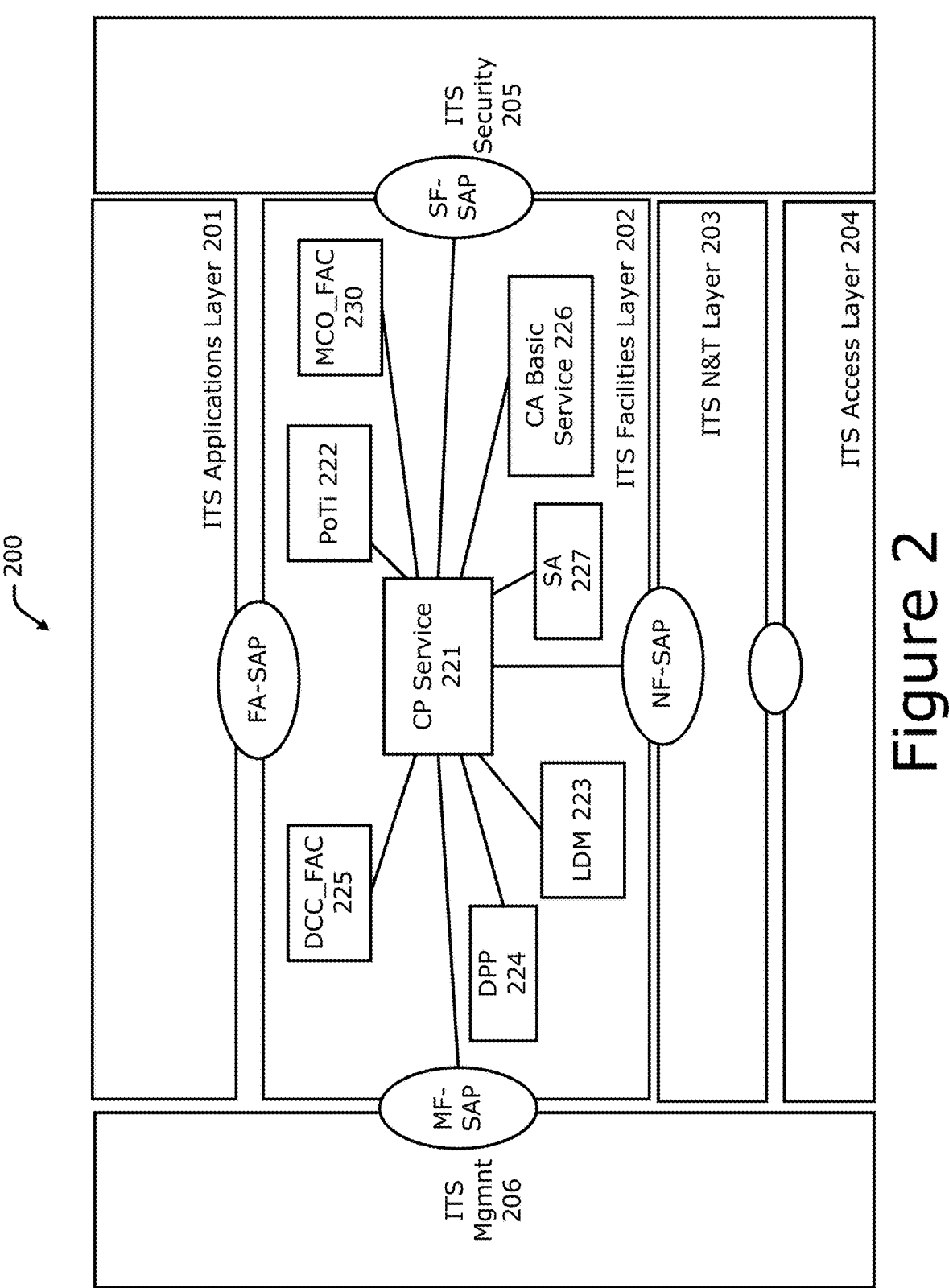
FIG. 2 depicts an ITS-S reference architecture, in accordance with various embodiments.

FIG. 2 depicts an example ITS-S reference architecture 200. The Collective Perception (CP) service (CPS) is a Facilities layer entity in the ITS-S architecture as defined in [EN302665]. The CPS may interface with other entities of the Facilities layer and with ITS applications to collect relevant information for collective perception message (CPM) generation and for forwarding received CPM content for further processing. FIG. 2 depicts the CPS within the ITS-S architecture along with the logical interfaces to other layers and entities within the Facilities layer.

CP is the concept of sharing a perceived environment of an ITS-S based on perception sensors. In contrast to Cooperative Awareness (CA), an ITS-S broadcasts information about its current (e.g., driving) environment rather than about its current state. Hence, CP is the concept of actively exchanging locally perceived objects between different ITS-Ss by means of V2X communication technology (or V2X RAT). CP decreases the ambient uncertainty of ITS-Ss by contributing information to their mutual Field-of-Views. The CPM enables ITS-Ss to share information about objects in the surrounding, which have been detected by sensors, cameras, or other information sources mounted or otherwise accessible to the transmitting ITS-S.

The CPS differs fundamentally from the CA basic service (see e.g., ETSI EN 302 637-2 V1.4.1 (2019-04)), as it does not focus on transmitting data about the current state of the disseminating ITS-S but about its perceived environment. To avoid broadcasting CPMs about the same object by multiple ITS-Ss, the CP service may filter detected objects to be included in CPMs (see e.g., clause 6.1 of ETSI TS 103 324 V0.0.17 (2020-04) ("[TS103324]")).

FIG. 2 shows the CPS-specific functionality, including interfaces mapped to the ITS-S architecture. The CPS-specific functionality is centered around the CPS Basic Service 221 located in the facilities layer. The CP Basic Service 221 is a facility at the ITS-S facilities layer 202 configurable or operable to generate, receive, and process CPMs.

The ITS-S applications layer 201 provides ITS services, and ITS applications are defined within the application layer 201. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009-06) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S 110 provides ITS applications to vehicle drivers and/or passengers, and may require an interface for accessing in-vehicle data from the in-vehicle network or in-vehicle system. For deployment and performances needs, specific instances of a V-ITS-S 110 may contain groupings of Applications and/or Facilities The facilities layer 202 comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (PoTi), Local Dynamic Map (LDM), collaborative awareness basic service (CABS) and/or cooperative awareness basic service (CABS), signal phase and timing service (SPATS), VRU basic service (VBS), Decentralized Environmental Notification (DEN) basic service, MCSs, and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013-08) (hereinafter "[TS 102894-1]").

For a vehicle ITS-S, the facilities layer 202 is connected to an in-vehicle network via an in-vehicle data gateway as shown and described in [T5102894-1]. The facilities and applications of a vehicle ITS-S receives required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode decentralized environmental notification message (DENM) entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity 206. The encode CAM/DENM entity to constructs (encodes) CAMs/

DENMs to include various, the object list may include a list of DEs and/or DFs included in an ITS data dictionary.

The ITS-station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors. FIG. 2 shows the CPS-specific functionality, including interfaces mapped to the ITS-S architecture. The CPS-specific functionality is centered around the CPS 221 located in the facilities layer, which consumes data from other facility layer services such as the Position and Time management (PoTi) 222, Local Dynamic Map (LDM) 223, DPP 224, DCC_FAC 225, CA basic service (CBS) 226, MCO_FAC 230, etc. The PoTi entity 222 provides the position of the ITS-S and time information. The LDM 223 is a database in the ITS-S, which in addition to on-board sensor data may be updated with received CAM and CPM data (see e.g., ETSI TR 102 863 v1.1.1 (2011-06)). Message dissemination-specific information related to the current channel utilization are received by interfacing with the DCC_FAC entity 225 and/or the MCO_FAC entity 230. The DCC_FAC 225 provides access network congestion information to the CPS 221. The MCO_FAC 230 may provide similar information in a multi-channel context. Additionally or alternatively, the CPS 221 may also be linked with other entities such as application support facilities including, for example, the collaborative/cooperative awareness basic service (CABS), SPATS, DEN service, MCS, VBS, and/or the like.

The networking & transport (N&T) layer 203 provides functionality of the OSI network layer and the OSI transport layer and includes one or more networking protocols, one or more transport protocols, and network and transport layer management. Additionally, sensor interfaces and communication interfaces may be part of the N&T layer 203 and access layer 204. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, User Datagram Protocol (UDP), VPN, one or more dedicated ITSC transport protocols, or some other suitable transport protocol. Each of the networking protocols may be connected to a corresponding transport protocol.

The access layer 204 includes a physical layer (PHY) connecting physically to the communication medium, a data link layer (DLL), which may be sub-divided into a MAC sub-layer managing the access to the communication medium, and a LLC sub-layer, management adaptation entity (MAE) to directly manage the PHY 204 and DLL, and a SAE to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used in various other implementations The CP Basic Service 221 may operate a CPM protocol, which is an ITS facilities layer protocol for the operation of the CPM transmission and reception. The CPM is a CP basic service PDU including CPM data and an ITS PDU header. The CPM data comprises a partial or complete CPM payload, and may include the various data containers and associated values/parameters as discussed herein. The CPS Basic Service consumes data from other services located in the facilities layer, and is linked with others application support facilities. The CPS Basic Service is responsible for transmission of CPMs.

For a vehicle ITS-S, the DDP 224 is connected with the in-vehicle network and provides the vehicle state information. The PoTi 222 provides the position of the ITS-S and time information. The LDM 223 is a database in the ITS-S, which in addition to on-board sensor data may be updated with received CAM and CPM data (see e.g., ETSI TR 102 863). ITS applications may retrieve information from the LDM 223 for further processing. The CP Service may also interface with the Service Announcement (SA) Service 227 to indicate an ITS-S's ability to generate CPMs. Message dissemination-specific information related to the current channel utilization are received by interfacing with the DCC_FAC entity 225 and/or the MCO_FAC entity 230. The DCC_FAC 225 provides access network congestion information to the CPS.

Although not shown, the CPS could interface with other facility layer functions (or simply a "facilities"), such as MCS, etc., for coordinating respective services/data to/from other layers. As examples, the other facilities/services may include the collaborative awareness basic service (CABS) and/or cooperative awareness basic service (CABS), SPATS, vulnerable road user basic service (VRUBS), DEN basic service, MCS, and/or the like. The CPS Basic Service may also interact with a CPS profile management entity in the management layer to CPS-related purposes.

The CPS interfaces through the Network—Transport/Facilities (NF)-Service Access Point (SAP) with the N&T layer for exchanging of CPMs with other ITS-Ss. The CPS interfaces through the Security-Facilities (SF)-SAP with the Security entity to access security services for CPM transmission and CPM reception. The CPS interfaces through the Management-Facilities (MF)-SAP with the Management entity and through the Facilities-Application (FA)-SAP with the application layer if received CPM data is provided directly to the applications. Each of the aforementioned interfaces/SAPs may provide the full duplex exchange of data with the facilities layer, and may implement suitable APIs to enable communication between the various entities/elements.

Figure 12:
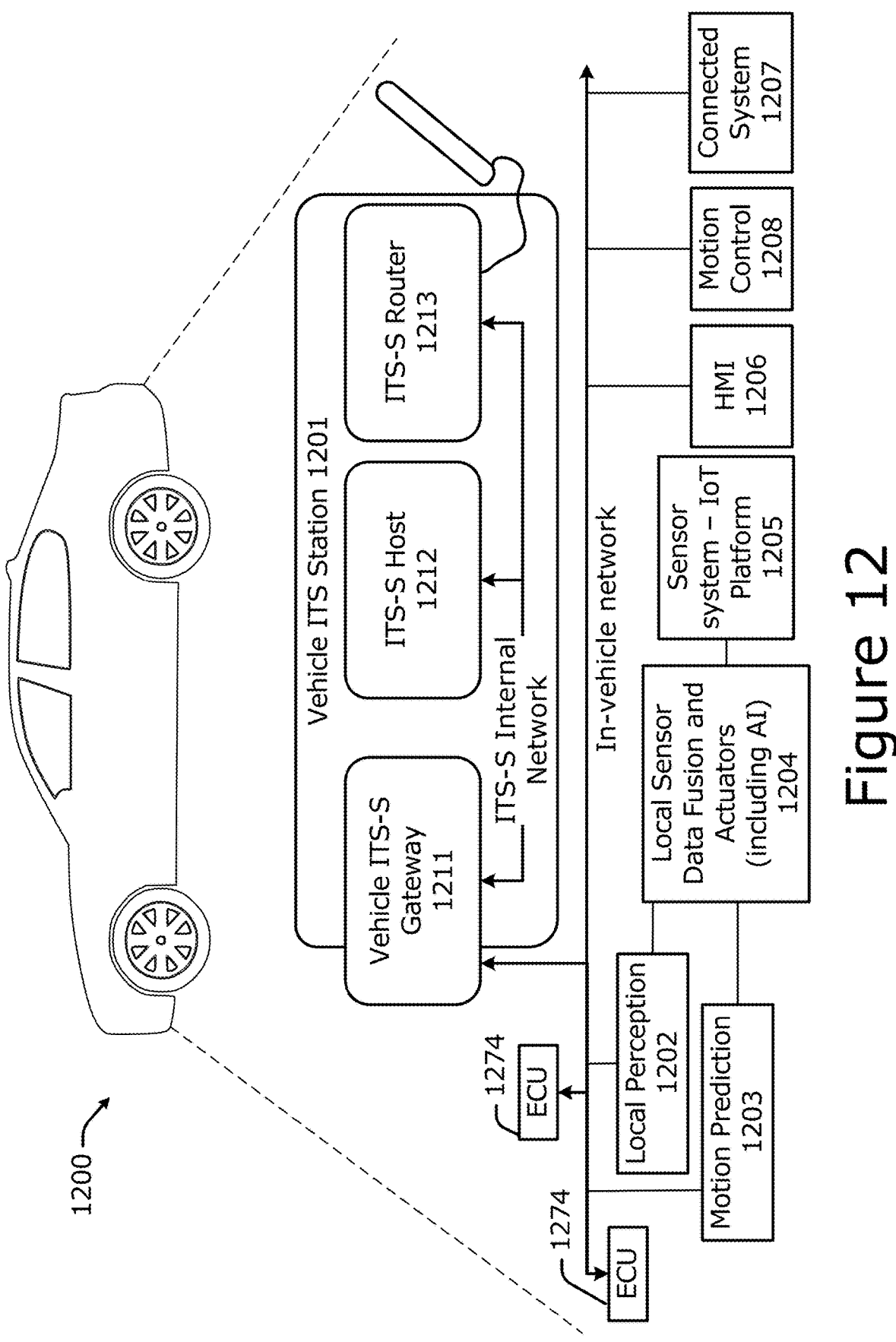
FIG. 12 depicts a vehicle ITS station (V-ITS-S) in a vehicle system, in accordance with various embodiments.

The ITS-S reference architecture 200 is applicable to the elements of FIG. 12. Additionally, other entities that operate at the same level but are not included in the ITS-S include the relevant users at that level, the relevant HMI (e.g., audio devices, display/touchscreen devices, etc.); when the ITS-S is a vehicle, vehicle motion control for computer-assisted and/or automated vehicles (both HMI and vehicle motion control entities may be triggered by the ITS-S applications); a local device sensor system and IoT Platform that collects and shares IoT data; local device sensor fusion and actuator application(s), which may contain ML/AI and aggregates the data flow issued by the sensor system; local perception and trajectory prediction applications that consume the output of the fusion application and feed the ITS-S applications; and the relevant ITS-S. The sensor system can include one or more cameras, radars, LIDARs, etc., in a V-ITS-S 110 or R-ITS-S 130. In the central station, the sensor system includes sensors that may be located on the side of the road, but directly report their data to the central station, without the involvement of a V-ITS-S 110 or R-ITS-S 130. In some cases, the sensor system may additionally include gyroscope(s), accelerometer(s), and the like (e.g., "sensor circuitry").

2. Example Embodiments

2.1. DCC for Single and Multi-Channel Orchestration and Scheduling for Multi-Service Heterogeneous Access with Collaborative Stations

2.1.1. Introduction and Summary

Initial deployment of ETSI ITS ecosystems may be on a single channel for cooperative ITS with appropriate congestion handling mechanisms. The applications/services selected for initial deployment (also called Day 1 or Release 1 applications/services) may be limited to applications or services such as CA, DEN, signal phase and timing (SPaT), MapData messages (MAP), In-vehicle Information (IVI) services, etc.

Other ITS applications/services may be viewed as "Release 2" or "Day 2" and beyond applications for the ITS system. Introduction of Release 2 and future applications may result in growing demand of communication bandwidth.

One way in which the growing demand for communication bandwidth may be satisfied by use of multiple radio communication channels in parallel. Specifically, in some cases a single ITS application (such as a CPM, a maneuver coordination message (MCM), sensor sharing, see-through) may require more than one channel. Utilization of multiple bands in parallel may be referred to as Multi-channel Operations (MCO). Coexistence of various ITS service-messages such as a signal phase and timing extended message (SPATEM), MAP/map extended message (MAPEM), CAM, DENM, CPM, MCM, VRU awareness messages (VAM), Intersection safety messages, Warning messages, and other messages may require coordinated MCO wherine multiple channels may either be on the same spectrum/band or on multiple spectrums/bands. Multiple channels may also use different access technologies and access interface types.

Embodiments herein relate to techniques for MCO Coexistence of various Release 1 and Release 2 ITS service-messages. Generally, embodiments may relate to solutions to maintain maximum compatibility with Release 1 or Day 1 deployment of an ETSI ITS communication system. Embodiments may further relate to a primary/default channel concept and mechanisms to maximize transmission of high-priority ITS service messages on the primary channel. Embodiments may further relate to enhances to a service announcement service (SAS) for effective use of MCO with multi-band and multi-RAT support. Embodiments may further relate to the interaction between an application and an MCO entity (e.g., MCO_FAC entity 230) of an ITS-S to decide relative treatment among messages from various applications. Embodiments may further relate to a mechanism to enable an MCO entity of an ITS-S to control application message rate and size. Embodiments may further relate to solutions to handle channel busy ratio (CBR) measurement challenges of multiple channels for MCO operation. Embodiments may further relate to the interaction between an MCO entity of an ITS-S and a service announcement management (SA-Management) entity to optimize MCO decisions and operations.

For the sake of discussion herein, with respect to section 2.1 and its collective subsections, the term "MCO entity" may be used. An MCO entity may be an aggregate term that is used to refer to one or more MCO entities that may exist at different layers of an ITS architecture such as the management layer, the application layer, the facilities layer, etc. Generally, an "MCO entity" will be understood to be a logical entity that may be implemented by one or more processors.

2.1.2. ITS-S Service Messages

ETSI ITS standard has considered various ITS services/applications for safety and traffic efficiency. However, ETSI may not have defined mapping of these applications to various available channels for transmission. Because the receiver will be listening to the channels where ITS services/applications packets are being transmitted, such static/dynamic mapping of applications to channels/technologies may be important for efficient use of MCO. ETSI has identified several applications for Release 1 or Day 1 ITS services/applications such as CA, DENM, SPaT, MAP, In-vehicle Information (IVI). All these messages may, in legacy embodiments, be transmitted on a single channel in absence of MCO. MCO considers multi-channel operation optimization for transmission and coexistence of various Service-messages defined so far and to be defined in future for ITS. Selected examples of such ITS service-messages may include:

SPATEM;

MAPEM;

CAM for Cooperative Awareness Service (CAS);

DENM;

CPM for CPS;

MCM for MCS;

VAM for VRU awareness Service (VAS);

Intersection safety messages; and

Other messages such as Cooperate Adaptive Cruise Control (CACC), Communications Based Train Control (CBTC), Platooning Control Message (PCM), etc.

2.1.3. MCO Solutions to Maintain Maximum Compatibility with Release 1 or Day 1 Deployment of ETSI ITS Communication System In embodiments, the MCO concept may be considered to be an extension of the communication architecture of the single channel concept. It may further be desirable for the MCO concept to be developed with backward compatible resource allocation when extending over multiple channels for Release 2 or Day 2 and future applications. One solution to address these requirements is to ensure more and more ITS services for road users with a single transceiver which are tuned to a single channel.

2.1.3.1. Primary/Default Channel and Related Operations

Embodiments herein may relate to use of a primary/default channel on a spectrum, where most of the receivers along with road users with single transceivers are tuned to receive ITS service packets. As used herein, the term "spectrum" refers to frequency bands such as the 2.4 gigahertz (GHz) band, the 5.9 GHz band, etc. At each of these frequency bands, there may be some frequency allocated for ITS. For example, there may be a frequency subband for one or more channels (e.g., each channel of approximately 10 megahertz (MHz)) within the greater frequency band.

If there are single-transceiver road users with various RAT supported, then redundant copies of an ITS service message designated for the primary/default channel may be transmitted over more than one RAT or communication technology to cover all road users with heterogeneous RAT or communication technology support. The term "secondary channels" or "offload channels" are used interchangeably herein to refer to radio channels that are different than the primary channel.

Generally, the primary channel may be considered as a default channel for transmission of ITS service messages. One example of primary channel may be a control channel, while secondary channels may be other remaining channels available for transmission of ITS service messages.

In some embodiments, ITS service message(s) on the primary channel may be considered a higher priority message, and be transmitted in a broadcast transmission. ITS service message(s) on a secondary channel may be considered as relatively lower priority messages or focused for specific user groups. These ITS service messages on secondary/offload channels be transmitted as broadcast, unicast, or groupcast.

In one embodiment, the primary channel may be on one of the ITS-band (e.g., 5.9 gigahertz (GHz)) channels, while secondary channels are on remaining channels on either the ITS-band or another band. The primary channel may be repeated on more than one RAT/access-interface/communication-technology if the road-users and infrastructure nodes are using heterogeneous RAT/access-interface/communication-technology. Heterogeneous RAT/access-interface/communication-technology' may include a peer-to-peer cellular access interface (such as cellular vehicle-to-anything (C-V2X), NR vehicle-to-anything (V2X) interfaces, etc.), a direct cellular access interface (such as a vehicle-to-infrastructure (V2I) interface like Uu, NR), a DSRC link, a Wi-Fi link, and so on. Similarly, secondary channels may use a peer-to-peer cellular access interface (such as C-V2X, NR V2X interfaces), direct cellular access interface (such as V2I interfaces like Uu, NR), DSRC link, Wi-Fi links, and so on.

In some embodiments, primary and secondary channels can be defined separately for different categories of services. For example, there can be a primary channel for ITS safety applications/services, while another primary channel for ITS non-safety applications/services.

2.1.3.2. Maximizing Transmission of High-Priority ITS Service Messages on the Primary Channel for Backward Compatibility with Release 1 Deployment Some embodiments herein may relate to maximizing ITS service message transmission on the primary/default channel so that Release 1 deployment or the users with a single transceiver may receive as many crucial messages as possible. FIG. 3 depicts various different solutions for this maximization. For the sake of discussion of the embodiments of FIG. 3, a pre-defined portion of the estimated average channel capacity available for each node on the primary channel may be reserved for high-priority (e.g., "urgent" or "emergency") on-demand messaging. The size of the reserved portion may be some percentage (from 0 to 100%) of the estimated channel capacity. Because the size of periodic high-priority message may change over time, such reservation may be used to ensure high-priority message(s) can be transmitted on the primary channel. Some message may be high-priority and event based (such as DENM). To ensure transmission of such high-priority event triggered messages on the primary channel, reservation of portion of channel capacity on the primary channel is needed.

Figures 3A, 3B:
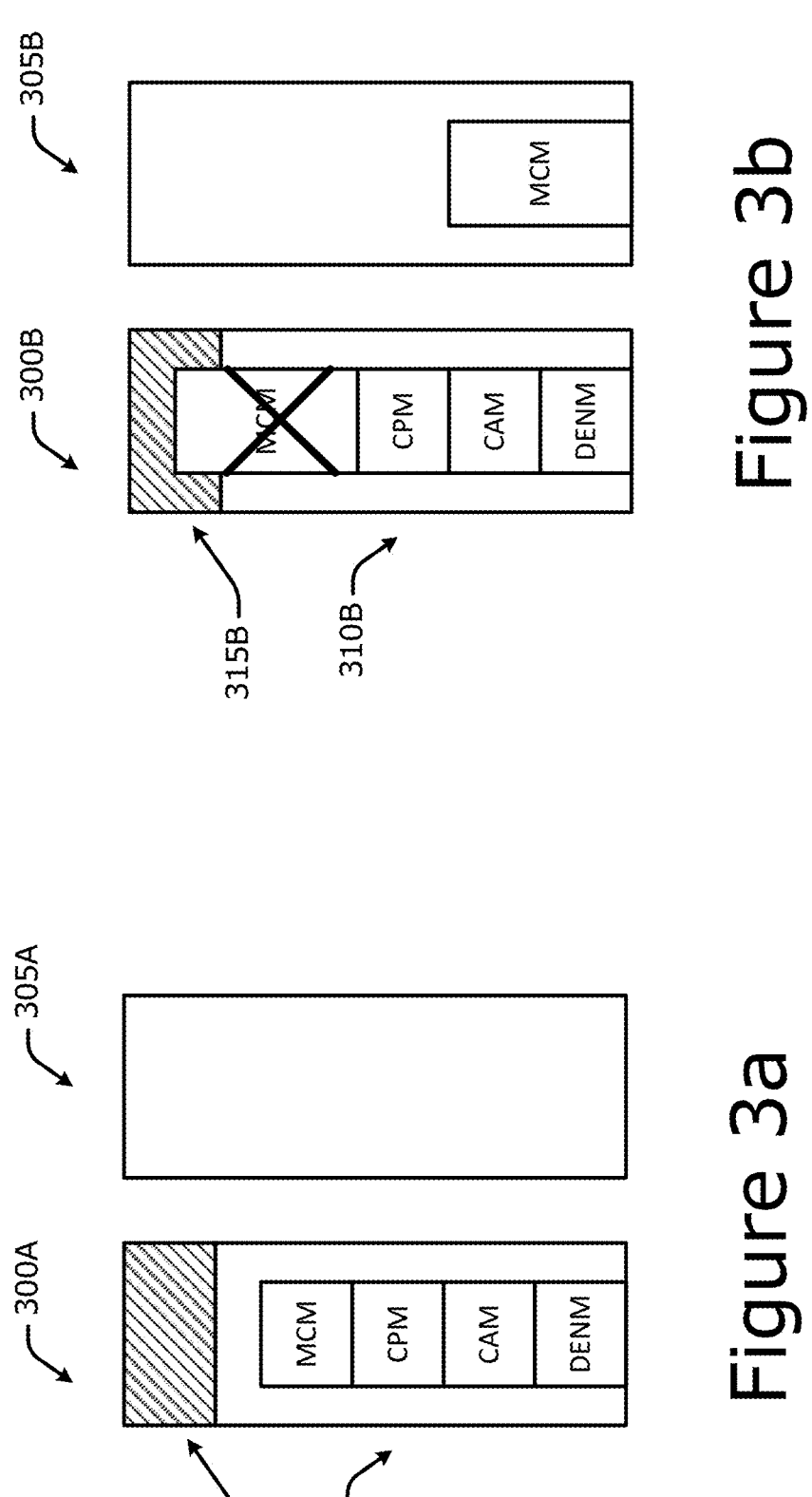
FIGS. 3*a*, 3*b*, 3*c*, and 3*d* (collectively, "FIG. 3") depict examples of offloading of an ITS service message from a primary channel to a secondary channel, in accordance with various embodiments.

The MCO entity may define the relative priority of messages to be transmitted on primary channel. For example, in one embodiment, priority in descending order can be DENM>CAM>CPM>MCM. DENM being of highest priority. FIG. 3a depicts such an example. Specifically, 300A depicts the primary channel, while 305A depicts the secondary channel. 315A is a portion of the primary channel 300A that is reserved as described above. 310A is the available bandwidth of the primary channel 300A on which ITS-S service messages may be transmitted. As can be seen, the overall bandwidth required by the MCM, CPM, CAM, and DENM messages may be more than the available bandwidth 310A, and so no ITS-S messages are required to be offloaded to the secondary channel 305A.

FIG. 3b depicts an alternative embodiment. Specifically, FIG. 3b depicts a primary channel 300B and a secondary channel 305B. The primary channel 300B may have an available bandwidth portion 310B and a reserved portion 315B. In this embodiment, the relative priority of the ITS service messages may be as follows: DENM>CAM>CPM>MCM. As can be seen, the bandwidth required for transmission of the ITS service messages may be greater than the available bandwidth 310B of the primary channel. Therefore, the lowest-priority message (e.g., MCM) may be offloaded to the secondary channel 305B.

Figure 3C:
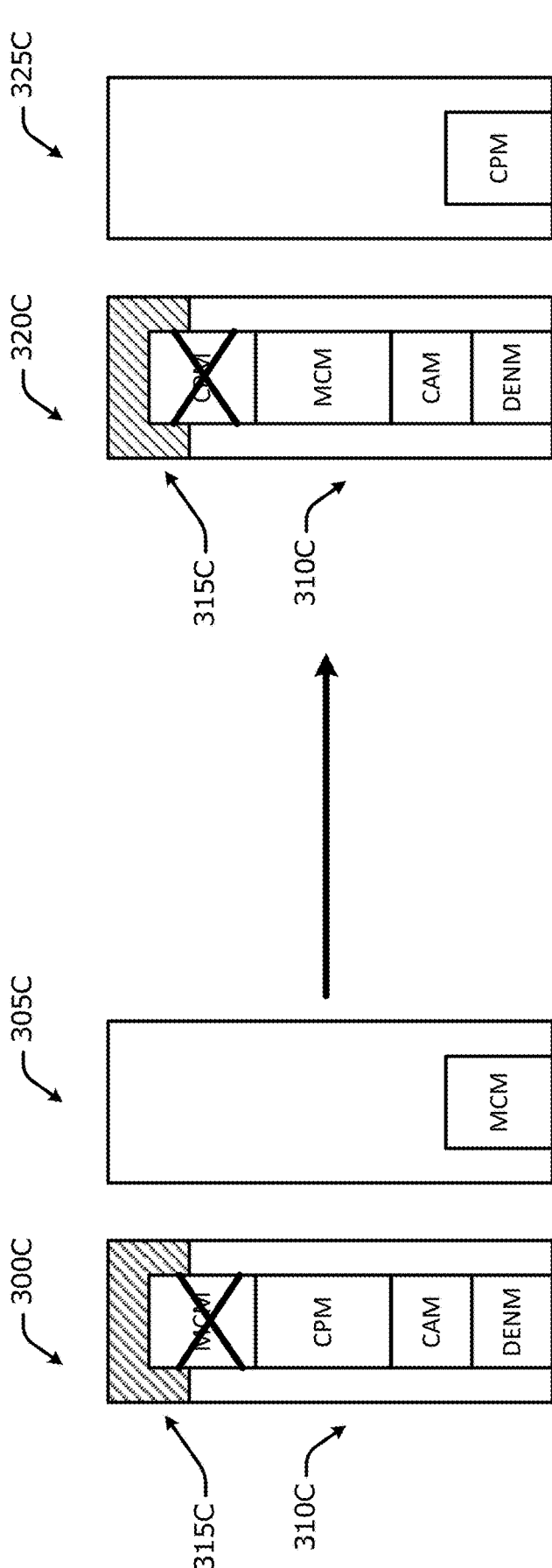

FIG. 3c depicts an alternative embodiment. Specifically, FIG. 3c depicts a primary channel 300C at time n and a secondary channel 305C at time n. FIG. 3c further depicts a primary channel 320C at time n+1 and a secondary channel 325C at time n+1. The primary channels 300C and 320C may have an available bandwidth portion 310C and a reserved portion 315C. In this embodiment, the relative priority of the ITS service messages may be as follows: DENM>CAM>CPM=MCM. That is, CPM and MCM may equally have lowest priority.

As can be seen, the bandwidth required for transmission of the ITS service messages may be greater than the available bandwidth 310C of the primary channel 300C/320C. Therefore, the lowest-priority message (e.g., MCM or CPM) may be offloaded to the secondary channels 305C/325C. In one embodiment (not shown), the MCO entity may choose one of the messages with the lowest priority (CPM or MCM) and consistently transmit that message on the secondary channel 305C/325C. In the depicted embodiment, the MCO entity may alternative which of the messages with the lowest priority is transmitted on the secondary channel 305C/325C. Specifically, MCM may be transmitted on the secondary channel 305C at time n, and CPM may be transmitted on the secondary channel 325C at time n+1. In this embodiment, users tuned only to the primary channel 300C/320C may still be able to receive both the MCM and CPM.

Figure 3D:
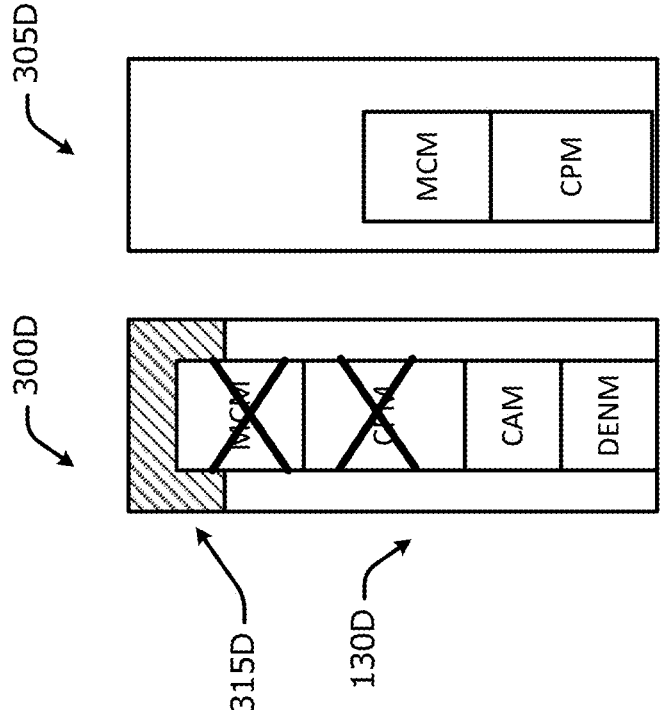

FIG. 3d depicts an alternative embodiment. Specifically, FIG. 3d depicts a primary channel 300D and a secondary channel 305D. The primary channel 300D may have an available bandwidth portion 310D and a reserved portion 315D. In this embodiment, similarly to FIG. 3c, the relative priority of the ITS service messages may be as follows: DENM>CAM>CPM=MCM. That is, CPM and MCM may equally have lowest priority. In this embodiment, both the MCM and CPM may be offloaded to the secondary channel 305D as shown.

In embodiments, the priority of different messages may be based on different factors. For example, in some embodiment the priority may be based on pre-defined priorities (e.g., one message always has a higher priority than another). In some embodiments a priority of a message may be based on a "freshness" factor as described below. In some embodiments, a priority of a message may be based on a service or application to which the specific message relates.

In some embodiments, the various priorities may be based on additional or alternative factors, or some combination of factors.

2.1.3.3. MCO-Assistance (Mas) and Service Announcement Essential Messages (SAEM)

In some embodiments, the primary channel may carry a MAS. The MAS may carry one or more of SAS Assistance Information and Semi-Static Channel Association to Messages:

SAS Assistance Information may include information about where to find SAEMs associated with applications/ services for which SAEMs are not transmitted on the primary channel. As a result, the SAS Assistance Information may provide flexibility to dynamically assign channels for SAEMs for current and future applications. It may also provide flexibility to dynamically assign channels for SAEMs for current and future applications/services.

In some embodiments, if there are separate primary channels for ITS safety applications/services and ITS non-safety applications/services, then one SAS assistance message may be transmitted on each primary channel. An SAS assistance message on a primary channel (for security applications) may include information about where to find SAEMs associated with safety applications for which SAEMs are not on the primary channel for security applications. An SAS assistance message on a primary channel (for non-security applications) may include information about where to find SAEMs associated with non-safety applications for which SAEMs are not on the primary channel for non-security applications.

In the case of semi-static association of channels for messages triggered by an applications or awareness services, channel associations of these messages may be included in MAS. Channel association information for the messages being transmitted on the primary channel may, in some embodiments, be excluded.

2.1.4. Enhancements to SAS for MCO

SAS enables advertisement by sending a SA for a service/ application in an SAEM, as described above. As noted above, the SAEM may carry information about how and where to receive the associated service/application message. Embodiments herein relate to the following enhancement for SA procedures in order to enable efficient MCO—assuming some users/cellular ITS-Ss (C-ITS-Ss) may be equipped with only one transceiver, others may be equipped with multiple transceivers, some may support one RAT/access-interface/communication-technology, and others may support multiple RATs/access-interfaces/communication-technologies.

For MCO, in some embodiments, the periodicity of an SAEM from a C-ITS-S may be decided based on the active message services at the C-ITS-S. For example, if the node transmits CAM, CPM and MCM periodically, periodicity of the SAEM may be configured to be smaller than periodicity of any of these messages.

In one embodiment, periodicity of SAS may be selected as a sub-integer multiple of the smallest periodicity among periodicities of these messages (CAM, CPM, MCM). This selection may be to ensure receivers know about next offloading channel for associated applications in case offloading channel selection or association is dynamic—by receiving at least one SA in SAEM.

In some cases, if CAM is transmitted on a known channel (e.g., the default/primary channel) then periodicity of the SAEM for other messages (CPM, MCM) on secondary/ offload channel should be configured smaller than periodicity of any of these messages (CPM, MCM)—as only CPM and MCM will be offloaded to the potentially secondary channel.

In one embodiment periodicity of the SAS may then be selected as a sub-integer multiple of a smallest periodicity among periodicities of these messages (CPM, MCM, . . . ). This selection may ensure that receivers know about the next offloading channel in case offloading channel selection or association is dynamic.

In some embodiments, N number of SAEM transmissions may be mandated after the decision to change the offloading channel for an associated application and before the actual offloading of the application starts to the new channel. This mandate may provide multiple opportunities for an intended receiver to get at least one copy of SA in SAEM about the change in offload channel for an application message. In some embodiments, it will be noted that some receivers may be half-duplex, and therefore may not be able to receive messages in the same transmission time interval (TTI) at access layer where it is transmitting itself.

Intended receivers (especially users with single transceiver configuration) of a service/application may be listening to different channels. In this case, the SAEM for that application may need to be transmitted on all these channels with intended receivers. Alternately, the application's SA may need to be included in different SAEMs transmitted to subsets of these channels with intended receivers.

For example, in legacy ITS ecosystems, applications with the same Minimum Dissemination Area (MDA) requirements may be grouped into an SAEM for the SA. However, in the case of MCO, it may be desirable to include an application's SA to multiple SAEMs targeted for multiple channels with intended receivers. An SAEM for a channel may need to group SAs for all applications for which intended receivers are present on that channel. It may result in SA for an application being included in multiple SAEMs. For example, intended receivers for Applications A1 and A2 may be on Channel X1 and intended receivers for Applications A1 and A3 may be on Channel X2. Then, in one example, an SAEM S1 (with SA for A1 and A2) can be transmitted on channel X1, while another SAEM S2 (with SA for A1 and A3) can be transmitted on channel X2.

Users with multiple transceivers may be tuned to multiple RATs (e.g., to LTE-V2X and NR-V2X) simultaneously. In such a case, a user may get an SA for an application over multiple RATs. Associated application messages may also be coming on both RATs. The user may then receive one or more service/application messages on one or both of these RATs. If SA for the application is coming on both RATs (RAT-1, RAT-2), while the application message is on only one RAT (say RAT-2), then the user should keep listening on RAT-2 to get the service message, while the user may also switch to transmitting messages on RAT-1.

In a heterogeneous system in terms of RATs, there may be some users listening on RAT-1, some on RAT-2, and some on both RATs (which may be referred to as "multi-transceivers Users"). If all these users are registered for SAs for the same applications, a single SAEM may be repeated on all RATs. However, if users on RAT-1 are registered for SA for applications (say A1, A2) and users on RAT-2 are registered for SAs for applications (say A2, A3), two SAEMs may be transmitted in one typical example. For example, SAEM S1 (with SA for A1 and A2) may be transmitted on RAT-1, while another SAEM S2 (with SA for A2 and A3) may be transmitted on RAT-2. Here application A2 may be advertised in two SAEMs due to multi-RAT scenario and interested users are tuned to different RATs.

The SAEM may be transmitted on the primary channel so that most of the receivers know about the offered services and where and how to get the service information when MCO is active. In another embodiment, the SAEM may be transmitted on separate channels and RATs, however, at least information about SAEM channels/RATs should be included in the MAS message transmitted on the primary channel or a known channel.

For example, if the primary channel is congested beyond a threshold, SAEM transmission on the primary channel may be offloaded to another channel. In this case, an SAS assistance information may be allowed to be transmitted by the facility layer of an ITS-S in coordination with the relevant MCO entity on primary channel or on a known channel to simplify reception of SAEMs for various applications. SAS assistance information may provide a summary of where to receive various SAEMs with SAs for services of interest to diverse user groups. In some embodiments, SAS assistance information may also be included as a part in a generic MAS message transmitted on the primary channel.

2.1.5. Interaction Between Application and MCO to Decide Relative Treatment Among Messages from Various Applications The MCO entity may decide relative priorities among various service messages while deciding to transmit on primary channel or channels with more intended receivers (ensuring more receivers can hear it) versus offloading to secondary channels. The MCO entity may be aware of the broad service category such as safety related services, awareness services, collaboration services, etc. However, the MCO entity may not know whether a service message at this particular message-instant contains some critical/important content as it may not be able to inspect the content.

Service messages usually have various types of contents—some content being crucial for receivers. Only application can know whether crucial content is present in a specific message-instant. Sharing such information by services to the MCO entity along with service messages may help the MCO entity to ensure proper handling of messages during congestion and offloading to proper channels.

In embodiments, when a service/application sends the service message for transmission to a facility-layer entity (e.g., MCO_FAC 230) it may also send an Inter Service-MAS Information (ISM-AI). For example, in case of CPS, it may indicate the presence of one or more types of following content types in the current CPM in the ISM-AI: Non-Connected Vehicles; Non-Connected and connected VRUs—further specifying cases like Human, Animal, group of Humans, Group of Animals, biker, etc.; and Detected Safety-Critical Objects.

Similarly, in case of MCS, ISM-AI may indicate the following content description to help the MCO entity: Normal planned/intended future maneuvers (e.g., keep on same lane following traffic); Lane change requiring coordination from road users in targeted lane; Requiring Time critical group coordination/negotiation for emergency trajectory alignment; and Other service messages that may also specify selected types of content as additional information to MCO in ISM-AI. In some embodiments, the ISM-AI may be specified as a bit-map of a given size for a specified service.

2.1.6. Mechanism to Enable MCO to Control Application Message Rate and Size

Embodiments may further include an IMS-AI between an MCO entity and Services/applications, as described above. Because the MCO entity may be more aware of overall channel congestion, channel utilization by various applications, and relative priorities and urgency of service messages, the MCO entity may be a better entity to recommend service/application message load reduction to applications.

The MCO entity may not be able to impose specific message generation frequency or message size, however, it may recommend a range in order to improve chance of message being successfully transmitted at the access layer. One or more of the services may have its own message generation rules and message content inclusion criteria, which may govern message generation frequency and message size. However, these rules may also provide flexibility to adopt message frequency and message size—which is where the MCO input may play a role. An application/service may adopt message frequency and message size based on the MCO entity's recommendation.

The IMS-AI may specify a recommendation based on one or more factors such as:

Preferred message frequency (pref-msg-freq)—the application may best try to keep message frequency<=pref-msg-freq;

Maximum message frequency (max-msg-freq)—application message frequency should not go beyond it, otherwise access layer message success may be adversely impacted;

Preferred message size (pref-max-size)—Application should best try to keep message size<=pref-max-size; and Maximum message size—Application should keep message size<=pref-max-size, otherwise access layer message success may be adversely impacted In some cases, the MCO entity may know available capacity (indicating message size and frequency) on the primary channel and a candidate application. However, in some cases the candidate application message may be slightly larger in terms of size or message rate. In this case, the MCO entity may recommend an application to reduce the message size and/or rate in an IMS-AI to get scheduled on the primary channel.

Similarly, the MCO entity may notice that most of the targeted receivers for a service S1 are tuned to an offload/Secondary channel (e.g., offload channel (OC) 2). However, the remaining capacity of the offload/Secondary channel OC 2 may fall slightly short to support the message from service S1 (in terms of message rate or message size or both). In this case, the MCO entity may recommend to service S1 to reduce message size and/or rate in an IMS-AI to get scheduled on a better offload channel OC 2.

2.1.7. Interaction Between the MCO Entity and SA-Management Entity

Some embodiments may include an interaction between the MCO entity and an SA-Management entity whereby the SA-Management entity provides/shares information about the number of users registered for SA for various applications/services. The SA-entity may also share other information such as an ITS-S communication profile, channel information used in various SAEMs, etc.

The MCO entity may then use this information to estimate better channels, RATs, communication-technologies, etc. to offload services/applications in order to reach the maximum intended receivers for various services/applications.

2.1.8. Solutions to Handle CBR Measurement Challenges of Multiple Channels for MCO Operations When offloading an ITS service message to a new channel, the MCO entity at a C-ITS-S may not have information about CBR on the new channel if it was not monitoring the channel.

CBR may be required to satisfy the congestion control limits imposed by DCC algorithms to offload a service message to a new channel.

In one embodiment, the MCO entity may continuously predict potential offload channel(s) for near future offloading and recommend users to measure CBR on this/those channel(s)—if users are equipped with multiple transceivers and transceiver(s) is/are available to listen to potential offload channel(s).

The MCO entity may use information from the interaction between the MCO entity and a SA-Management entity to select potential offload channel(s) for an application. For example, a measurement based on the maximum numbers of intended receivers for that application being tuned to a channel may be selected as potential candidate measurement to measure CBR.

In another embodiment, the MCO entity may identify a potential offload channel. Then, it may register as a user to a SA-Management entity for any SAEM coming on that channel. In this embodiment, a registration process for an SAS user may be used wherein the user may specify a channel or RAT as a criterion to receive a group of SAEMs coming on that channel or RAT. The SA-Management entity may notify the MCO entity about any SAEM coming on that channel or RAT.

The C-ITS-S transmitting SAEM on specific channel may incorporate a CBR measurement for that channel in the SAEM. C-ITS-S may also include CBR measurements available to it that are related to other channels.

In one embodiment, the MCO entity may register as a user for SAEM coming on all channels. CBR information on all channels may help the MCO entity in channel selection for potential future offload.

In another embodiment, if the MCO entity decides to offload a service/application message on a new channel, it may ask the access layer of the C-ITS-S of which it is a part to monitor and measure CBR on that channel. However, the CBR measurement may typically be performed over a time window (e.g., on the order of 100 milliseconds (ms)), so it may take a non-zero amount of time to get the CBR. Before the updated measured CBR is available, the MCO entity may use one or more of the following as a temporary CBR criteria for offloading to a new channel:

A pre-defined CBR (e.g., 50%);

A previously measured CBR value; and

All low-priority service messages are delayed until the CBR measurement is available, while high-priority service messages are allowed.

2.1.9. Example Technique Related to Use of Primary and Secondary/Offload Channel FIG. 4 depicts an example technique to be performed by an ITS-S architecture, in accordance with various embodiments. Generally, the technique may be performed by an MCO entity. Such an entity may be the MCO_FAC entity as described above, an MCO_CROSS entity as described elsewhere herein, some other MCO-related entity, or some combination of such entities. More specifically, the technique of FIG. 4 may be performed by one or more processors that are implementing such logical MCO-related entities.

The technique may include identifying, at 405, a plurality of ITS service messages that are to be transmitted on a primary channel of a wireless network. The ITS service messages may include a first ITS service message and a second ITS service message. As described above, the ITS service messages may include an MCM, a CPM, a CAM, a DENM, etc.

The technique may further include identifying, at 410, that the second ITS service message is to be offloaded to a secondary channel. As described above, such offload decision may be based on relative priorities of respective ones of the ITS service messages, or some other factor or criteria.

The technique may further include facilitating, at 415, transmission of a subset of the ITS service messages of the plurality of ITS service messages on the primary channel. The subset may include at least the first ITS service message, but may not include the second ITS service message that was identified to be offloaded to the secondary channel.

The technique may further include facilitating, at 420, transmission of the second ITS service message on the secondary channel. For example, as shown in FIG. 3*b*, the MCM may be identified at 410 to be offloaded to the secondary channel 305B. Facilitation of the transmission may include transmission of an indication by the MCO entity or the processor implementing the MCO entity to another processor (e.g., a baseband processor of a radio frequency (RF) module) that the transmissions of the ITS service messages on the primary channel are to occur at 415 and the transmissions of the ITS service message(s) on the secondary channel are to occur at 420.

It will be understood that this technique is intended as an example technique, and other techniques may be different in other embodiments. For example, certain elements of the technique of FIG. 4 may be performed in a different order than depicted, concurrently with one another, or otherwise vary in some other respect.

2.2. Example Techniques for Coordinated and Distributed Multi-Channel Operations to Enable Coexistence of Release 1 and Release 2 Service Messages

2.2.1. Introduction and Summary

The ETSI ITS TS for DCC, TS 103 141, focuses on adaptation of transmit parameters of the operating ITS-G5 access technology. Specifically, in ITS the two lowest logical layers are referred to as the access layer in the present document, and the technology specified for the access layer is collectively referred to as ITS-G5. The DCC access layer is referred to herein as DCC_ACC. Adaptation of the transmit parameters may be performed by distributing the channel resources among neighboring ITS-Ss based on prioritization among various messages, and orchestrating the resource availability to the DCC cross-layer management entity (referred to herein as DCC_CROSS). The TS may describe the functional behavior and interfaces to the facilities layer DCC entity (referred to as DCC_FAC as described above) to the DCC_CROSS. As noted above, a functionality of the DCC_FAC is to control the load generated by application and services at the generation time by considering the available channel resource information from the DCC-_CROSS including the message generation requirements from applications and services.

The technical considerations for DCC_FAC may be summarized as follows:

(1) Channel Resource Limit (CRL), which translates to the Channel Usage Limit set by access DCC, needs to be respected;

(2) For supporting multiple messaging services such as CAM service, DENM Service, CPS, MCS, VBS, SPATEM, MAPEM, SAS, etc., the channel access opportunity for a given ITS node must be dynamically assigned across services;

(3) Congesting the channels by generating excess packets and dropping of excess packets is undesirable and may preferably be minimized;

(4) Packet generation and transmission may occur with minimal delay, while at the same time respecting the CRL and fairness among services and handling such requirement is not clear in current DCC_FAC architecture; and (5) Design for DCC_FAC operation for multi-access technologies (e.g., multi-RAT).

The considerations from (1) through (5) may hold for single channel operation. However, functional considerations in DCC_ACC, DCC_CROSS and DCC_FAC from single channel operation (SCO) to MCO, are also addressed herein.

Embodiments herein address various of the considerations above. Specifically, embodiments relate to mechanisms for a single Facilities Layer entity (e.g., DCC_FAC and/or MCO_FAC) that performs orchestration/scheduling/resource sharing/control mechanisms with one or more of the following features:

(1) Priority/Urgency of services consideration for scheduling heterogeneous services with finer granularity for resource orchestration/balancing;

(2) Freshness/Age and Remaining Lifetime of Information (RLoI) considerations in addition to mechanism (1). The freshness of information may refer herein to the age of information (AoI). AoI refers to how old a packet is, and this information may be used to factor in the packet's priority/urgency. Another metric that may be used is the RLoI, which may relate to smaller relevant chunks of remaining useful information from the overall span of a packet (e.g. CAM, CPM, VAM), and which depends on the packet/service type (e.g. CAM can have a shorter remaining lifetime than CPM, for example). If the remaining (useful) lifetime of information is known, the scheduling policy/allocation may be determined and updated accordingly. Both the Freshness/Age of Information and RLoI may be used for efficient traffic management for congestion control.

(3) Extension to multi-access technology coexistence/input considerations, that is, heterogeneous access technology support (ITS-G5, C-V2X, LTE-V, 5G NR, etc.) orchestrated/coordinated/arbitrated by the facilities layer entity.

(4) As an extended embodiment to features 1 through 3 above, another feature relates to multi-channel support, that is, heterogeneous channel support which is termed as MCO.

2.2.2. Freshness Factor

Figure 5:
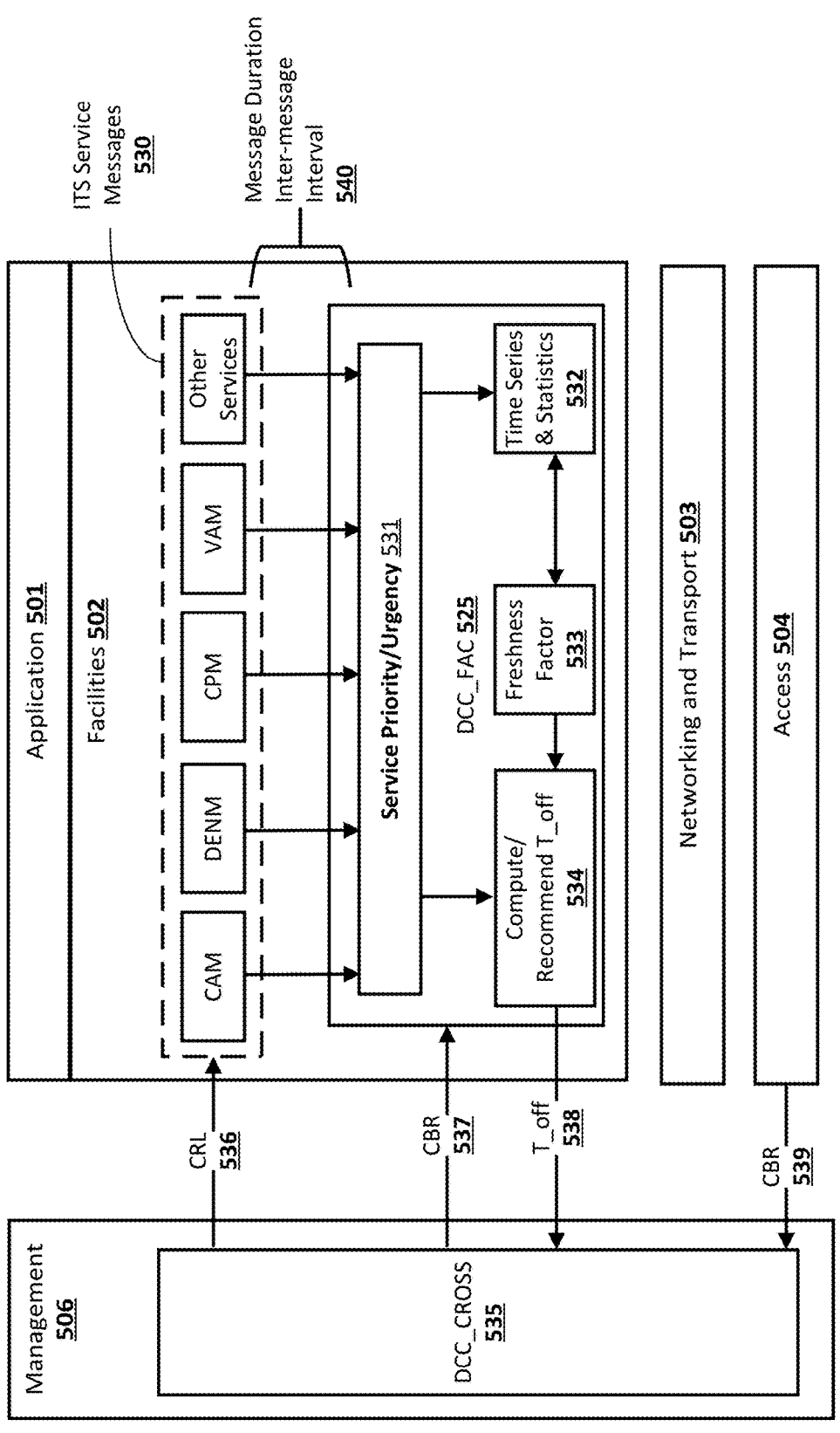
FIG. 5 depicts an alternative example ITS-S reference architecture configured for use of a freshness factor, in accordance with various embodiments.

FIG. 5 depicts an alternative example ITS-S reference architecture configured for use of a freshness factor, in accordance with various embodiments. Specifically, FIG. 5 depicts an ITS-S architecture with an application layer 501, a facilities layer 502, a networking/transport layer 503, an access layer 504, and a management plane 506, which may be respectively similar to element 201, 202, 203, 204, and 206 of FIG. 2. The facilities layer 502 may include a DCC_FAC entity 525 which may be similar to DCC_FAC entity 225 of FIG. 2. From a high-level perspective, the operation of the DCC_FAC entity 525 takes place as follows:

Assuming both the DCC_CROSS entity 535 in the management plane 506 and the DCC_FAC entity 525 in the Facilities Layer 502 are present, the DCC_CROSS entity 535 provides to the DCC_FAC entity 525 available CBR percentage per radio channel at 537 for each application/service.

Based on the CBR percentage and message duration/intermessage interval (which may be provided to the DCC- _FAC entity 525 at 540 along with, or based on, one or more ITS service messages 530), the DCC_FAC entity 525 calculates, at 534, the minimum inter-message interval $T_{off\ min\ ij}$ for an application/service j and traffic class i, and provides as an input the calculated/estimate for $T_{off\ min\ ij}$ at 538 to the DCC_CROSS entity 535.

Based on the received calculation/estimate of the minimum inter-message interval $T_{off\ min\ ij}$ at 538, DCC_CROSS utilizes a look-up table in the management plane to allocate a proportion of the available channel resource (CR) to the application/service and traffic class.

While undertaking the above actions, the DCC_FAC entity 525 may not have authority to drop any messages directly, and rather the DCC_FAC entity 525 may control the message rates indirectly through the DCC_CROSS entity 535. To help monitor data behavior from applications/services, the DCC_FAC entity 525 may also optionally implement and utilize statistics entity 532 for augmenting its estimation. Additionally, for some access layers such as C-V2X, unlike ITS-G5 access, the DCC entity at the access layer 504 may be tightly coupled with the underlying MAC and PHY layers. On the other hand, relying only on the access layer congestion control techniques via traffic class-based prioritization or queuing may lead to undesirable outcomes such as low-priority packet starvation, inability to distinguish between various services, and/or no option for services to orchestrate with one another for dynamically multiplexing the channel usage. Therefore, for the sake of discussion herein, it is not assumed that there is any coordination with the MAC/PHY access mechanisms, and rather embodiments are described with respect to the DCC_FAC entity 525 at the facilities layer 502, regardless of the underlying access technology.

For the sake of discussions herein, the instantaneous Channel Resource Limit (CRL) per node is defined, in general, as the fraction of the time any node can transmit its messages on the channel and is mathematically expressed as $$CRL_{node} = \frac{T_{onNode}}{T_{onNode} + T_{offNode}}, \tag{1}$$

where $T_{onNode} = T_{subframe} \cdot N_{subchannel}$ is the duration of a transmission subframe denoted by $T_{subframe}$ ($\geq 1$ ms) times the number of subchannels, denoted by $N_{subchannel} \geq 1$) and $T_{offNode} =$ the interval between two consecutively generated packets (no transmission)

On a time-averaged basis, for an application/service, $j \in \{1, 2, \ldots, N\}$, and a given traffic class (TC), $i \in \{1, 2, \ldots, K\}$, a node's estimated CRL can be expressed as an average across all applications, j, and TC, i, as $$\overline{CRL}_{i,j} = \frac{\overline{T}_{on,i,j}}{\overline{T}_{on,i,j} + \overline{T}_{off,i,j}} \tag{2}$$

Generally, the CRL calculation described above with respect to (1) and (2) may be viewed as a simplified legacy calculation of the CRL. Embodiments herein relate to the use of a "freshness factor" to assist with calculation of CRL.

The "Freshness of information" parameter can be implemented by the time series and statistics module 532 in the DCC_FAC entity 525, and may pass information to the DCC_CROSS entity 535 to possibly influence the DCC_CROSS entity's 535 decision for creating/updating the above-described look-up table within the management plane 506. The mathematical inclusion of this parameter during CRL computation in operations of the DCC_FAC entity 525 is described in greater detail below. The functionalities in the DCC Architecture is shown in FIG. 5 (e.g., Service Priority/Urgency 531, Time Series & Statistics 532, Freshness Factor 533, Compute/Recommend $T_{off}$ 534, etc.). In some embodiments, the access layer 504 may send the measured CBR to the DCC_CROSS entity 535 at 539. The DCC_CROSS entity 535 may then use the CBR as an input to determine the fraction of time that a node can be allowed to transmit thus resulting in the CRL as CRL=1−CBR (as one example mapping, for a given node) and provide the CRL to the facilities layer 502 at 536. In some embodiments, the packet delivery ratio (PDR), delay, or rate of the access layer may be considered as input to the CRL in addition to the CBR.

It will be understood that there is an interface for data exchange between the Statistics module 532 in the DCC_FAC entity 525 and the Freshness Factor functional block 533 for extracting the timestamps of the data relating to the age or freshness of information, which may be used to filter out the data that is outdated in time.

Figure 6:
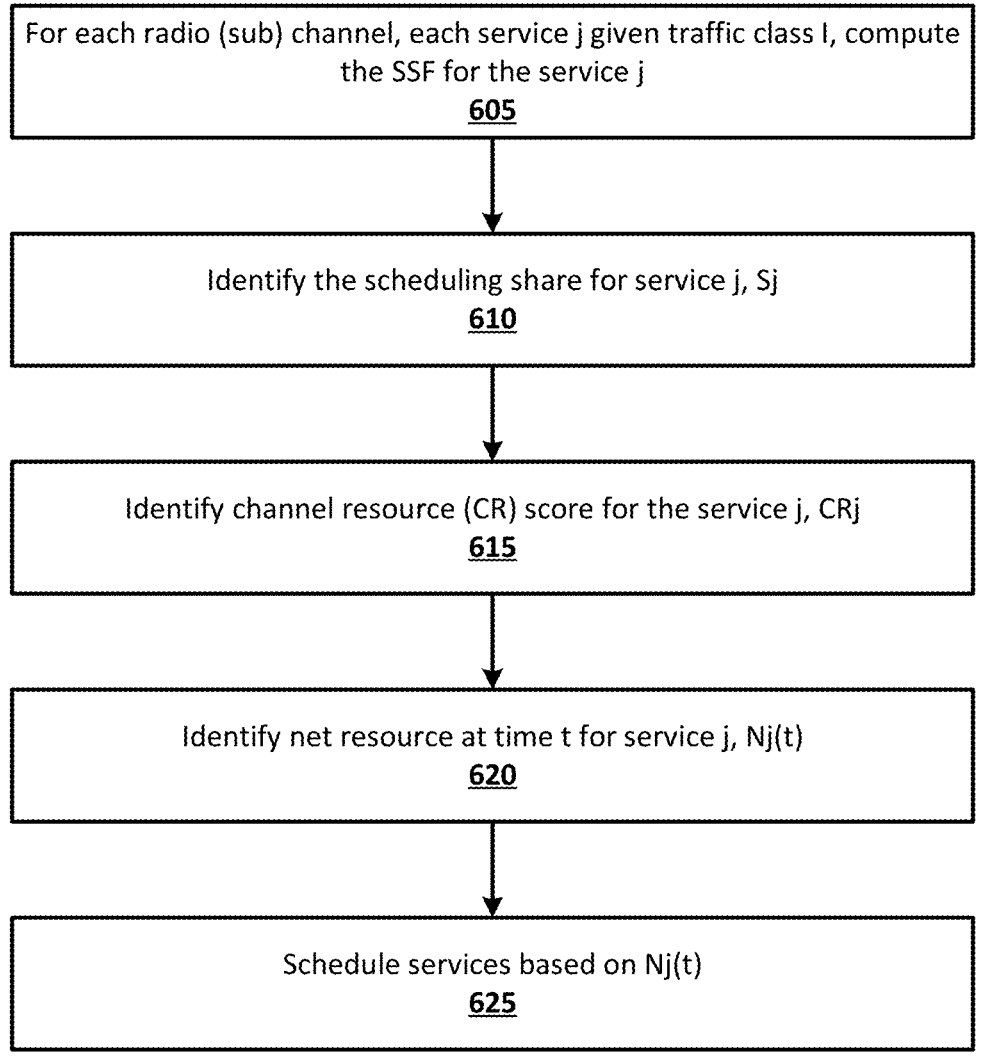
FIG. 6 depicts an example algorithm for network resource selection, in accordance with various embodiments.

The concepts in Freshness of information also extend similarly to the RLoI, and both are referred to herein as a "freshness factor." It will be noted that the discussion herein may be extended to a single facilities layer scheduler (as described in further detail below) for: Heterogeneous Multi-access technology such as ITS-G5, LTE-V, 5G NR, C-V2X, etc.; and Heterogeneous MCO—within the same technology Next, the details of an example orchestration/scheduling operation are elaborated with reference to FIG. 6. Specifically, FIG. 6 depicts an example algorithm for network resource selection, in accordance with various embodiments. For the sake of consistent discussion, the algorithm of FIG. 6 may be referred to as "Algorithm 1" elsewhere herein. Generally, aspects of Algorithm 1 may be performed by a DCC entity such as the DCC_FAC entity 525, the DCC_CROSS entity 535, some other DCC entity, or some combination thereof. It will be understood that this algorithm is intended as an example algorithm, and other algorithms may be different in other embodiments. For example, certain elements of the algorithm may be performed in a different order than depicted, concurrently with one another, or otherwise vary in some other respect.

At 605, for each radio (sub) channel $m \in \{1, 2, \ldots, M\}$, each service j given traffic class i, compute the service scheduling factor (SSF) for the service j, denoted by $SSF_j$ considering the service priority/urgency, $P_j$, where $0 \leq P_j \leq 1$ and the service Freshness Factor $F_j$, where $0 \leq F_j \leq 1$ as:

$$SSF_j = w_p \cdot P_j + w_f F_j \tag{4}$$

where $w_p \in \{U_1, U_2, \ldots, U_N\}$, is the priority/urgency weight factor with $U_k$ for $k \in \{1, 2, \ldots N\}$ corresponding to the service index (for a total of N services supported) and $w_f = -t$, if $t \leq FreshnessWindow_j$, $w_f = t$ if $t > FreshnessWindow_j$ with $FreshnessWindow_1$ being configurable within 100 ms $\leq FreshnessWindow_j \leq T_{service_jMax}$ such that $T_{service_jMax}$ is integer multiple of $(T_{on,j} + T_{off,j})$.

Then, the scheduling share for service j, denoted by $S_j$ is identified at 610 by the proportion of $SSF_j$ over total SSF across the number of available services N expressed as $$S_j = \frac{SSF_j}{\sum\limits_{j}^{N} SSF_j} \quad (5)$$

Thus, the instantaneous channel resource limit (CRL) for the application service j given traffic class i is jointly considered with the Priority/Urgency and Freshness Factor of the service j and summed over all possible traffic classes for the service to result in a total Channel Resource (CR) score for the service j at 615 as:

$$CR_j = \sum_i CRL_{i,j} \cdot S_j \quad (6)$$

Then, the net resource at time t for a service, denoted by $N_j(t)$ can be identified at 620 as the remaining resource after last transmission $N_j(t-1)$ plus any accumulated resource since last transmission during the period $\Delta t$, denoted by $A(\Delta t)$ minus the cost of transmission on a resource based on packet's air time, denoted by $C_j(t)$ which can be expressed after few steps of algebraic manipulation as $$N_j(t) = N_j(t-1) + \frac{\Delta t}{T_{on,j}(t-1)} \cdot S_j \cdot CRL_{i,j} \cdot S_j - C_j(t) \quad (7)$$

$$\text{where } C_j(t) = \frac{T_{on,j}(t) \cdot (1 - CRL_{i,j} \cdot S_j)}{T_{off,j}(t-1)CRL_{i,j} \cdot S_j}.$$

Then, for a given node, the services are ranked at 625 per their net resource availability (which inherently has taken the priority/urgency and freshness of information into account via expression (7)) and then scheduled in the order of highest $N_j(t)$ first.

2.2.3. On Extension to Multiple Access Technology—Context Awareness Information (CAI)-Based Joint Radio Access Technology Selection and Resource Recommendation (e.g., at DCC_FAC) and Scheduling (e.g., at DCC_CROSS)

Figure 7:
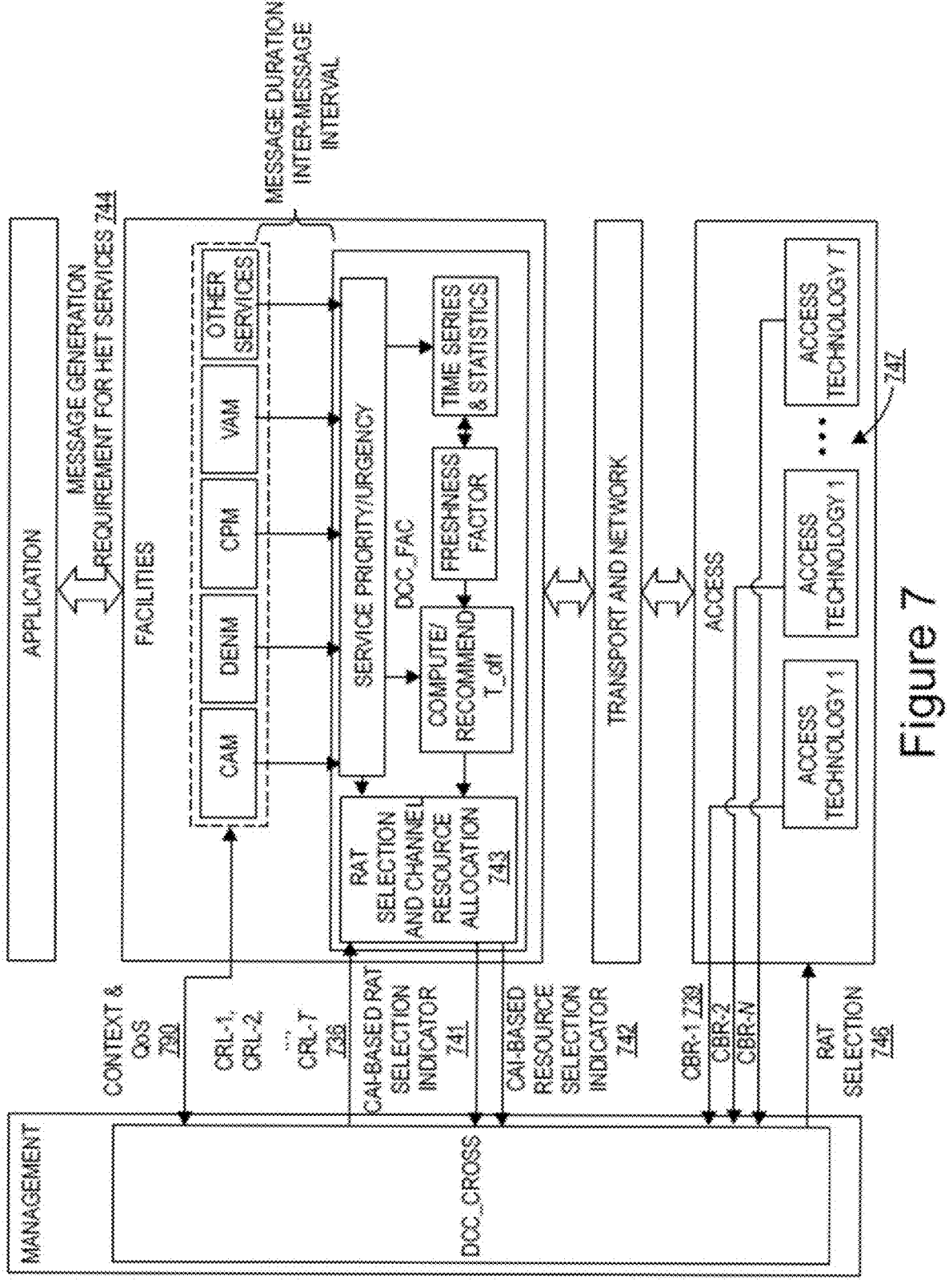
FIG. 7 depicts an alternative examples ITS-S reference architecture configured for use of a freshness factor in a multiradio access technology (RAT) scenario, in accordance with various embodiments.

Embodiments of this section may address the context of when there is more than one access technology on an actor. As used in this section, "access technology" may jointly refer to physical and medium access (MAC) layers, which are jointly referred to as a RAT. One example embodiment of a relevant ITS-S architecture is depicted in FIG. 7. Specifically, FIG. 7 depicts an alternative examples ITS-S reference architecture configured for use of a freshness factor in a multiradio access technology (RAT) scenario, in accordance with various embodiments. It will be noted that Algorithm 1 may be applicable to the embodiment depicted in FIG. 7, with the following additional/extended embodiments as described below. It will be noted that elements of FIG. 7 that are similar to those of FIG. 5 are not renumbered in FIG. 7 for the sake of clarity of the Figure and lack of clutter.

1: The initial message generation requirements for Heterogeneous (Het) services are acquired by the Facilities layer from the Application layer at 744. Such requirements may indirectly or directly represent the application layer context awareness and thus can be labeled as CAI, a term that may be referred to elsewhere in this document. Thus, this element may be simplified as involving the acquisition of the CAI. Some examples of CAI may include: position, speed, heading of neighboring actors, etc., and bringing this awareness to improve quality—accuracy/up-to-datedness of the information.

2: based on the acquired CAI sets the (i) Message Duration (ii) Inter-message Interval may then be provided fed into the DCC_FAC module as described with respect to FIG. 5.

3: The message generation requirements are translated into corresponding Context & QoS 790 by the Facilities layer which is interchanged two-way between the DCC_CROSS entity and the DCC_FAC entity so that DCC_CROSS has a periodic time-series database maintained on the context and QoS. In addition, whenever Facilities layer needs access to the time-series (including historical) data, it can probe the DCC_CROSS for such information either periodically or aperiodically (e.g., on-demand).

4: Assuming T access technologies 747 are available, the access layer can then send the corresponding CBRs, $\{CBR_1, \ldots CBR_t, \ldots, CBR_T\}$ to the DCC_CROSS at 739 which then maps them onto the equivalent CRLs, $\{CRL_1, \ldots CRL_t, \ldots, CBL_T\}$ at 736. In additional/extended embodiment, the PDRs, delays and rates of the access technologies utilizing their corresponding channels may also be considered as input along with CBRs (not shown in FIG. 5 and FIG. 7 for brevity) in order to help DCC_CROSS with filtering (reduction of subset) of some of the mapping subject to availability of this information from the access layer.

5: The CRLs are then fed to the Facilities layer DCC_FAC module where the Algorithm 1 is now extended to include the RAT selection at and channel resource allocation at 743. For the purpose of RAT selection, the RAT with the lowest CRL is selected so as to minimize possible congestion on the channel. For the purpose of channel resource allocation, that is, $T_{off}$ (or $T_{on}$) determination, the same procedure as in Algorithm 1 is undertaken (freshness factor, time series, analysis) once the RAT selection/recommendation is completed (channel resource allocation is next step after RAT selection). Specifically, the CAI-based RAT selection/recommendation and resource recommendation may be provided from the DCC_FAC to the DCC_CROSS at 741 and 742

6: The DCC_CROSS entity is responsible to schedule the V2X services of the corresponding channel resource (channel resource allocation) using Algorithm 1, and at the same time select the most suitable RAT. The RAT selection may be provided from the DCC_CROSS to the access layer at 746.

Figure 8:
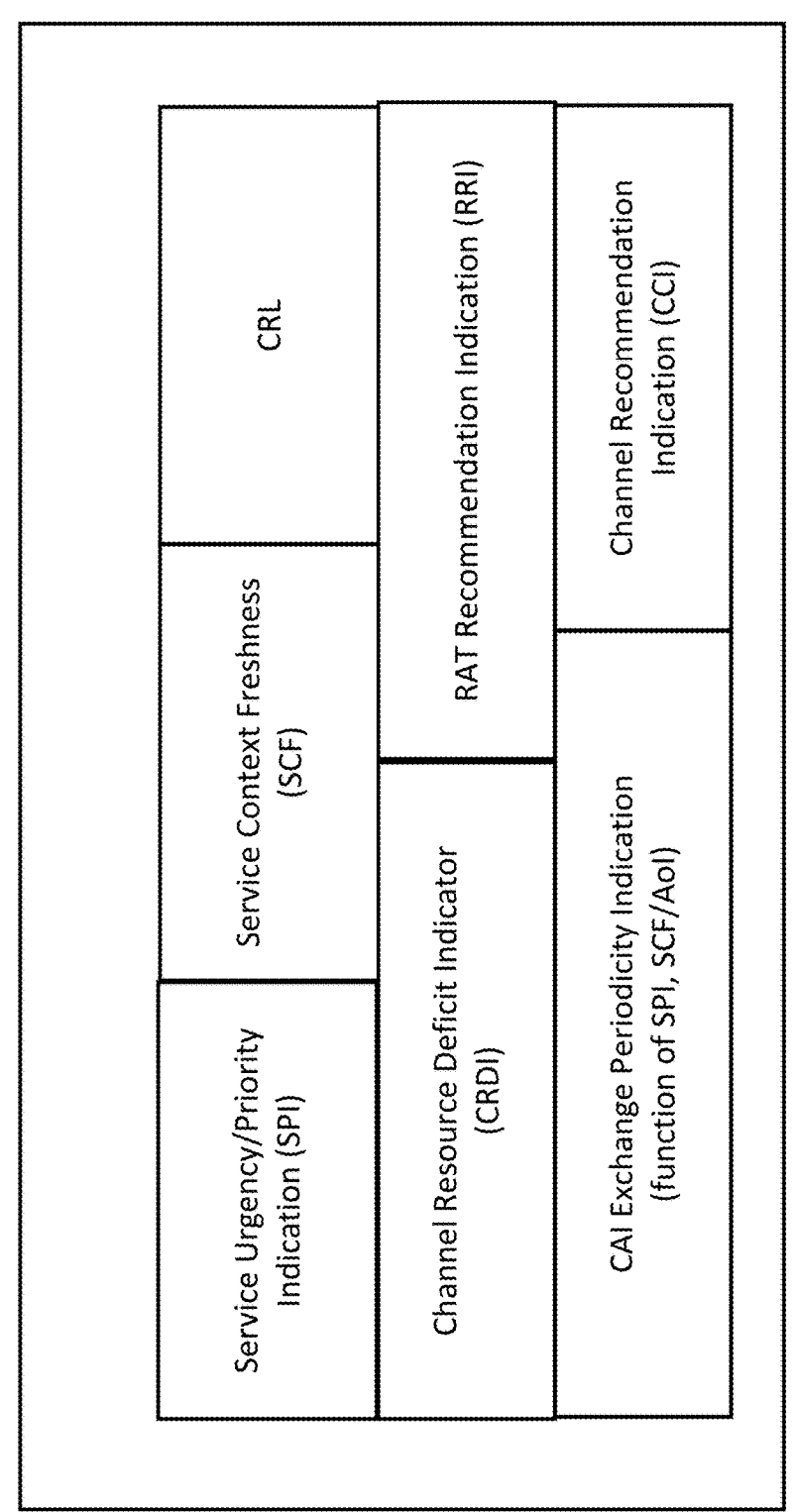
FIG. 8 depicts an example context awareness container, in accordance with various embodiments.

2.2.4. Extension of Resource Selection and Multi-Access Selection to Multiple Collaborative Road Actors:

In practice, real-world situations on the road may involve multiple actors utilizing multiple (and heterogeneous V2X services), and at the same time having multiple RAT options at their disposal. However, this may give rise to an enhanced congestion of the channel resources. This congestion may be especially prevalent for situations where there are large number of actors spread across, for example, multiple intersections in a smart city with multiple RSU deployments, and with few tens to few hundreds of vehicles and VRUs (actors) on the road at the same time. To address the problem of distributed congestion control for such situation, embodiments herein may exchange protocol and the underlying fields of such message called data elements. An example CAI is shown in FIG. 8, which depicts a Collaborative Resource Orchestration container 800 that indicates the important data elements which are used for enabling the orchestrated sharing of the limited channel resource among the multiple V2X services in conjunction with multiple RAT availability among multiple actors on the road where the actors can be ITS-Ss including but not limited to RSUs, vehicles, VRUs, among others. Specifically, FIG. 8 depicts an example context awareness container, in accordance with various embodiments.

Such an orchestration container 800 may allow for the ITS-S to exchange (in broadcast or multicast manner), the context awareness at one actor, along with the CRLs, RAT in use and any additional need for channel resources to the nearby actors (at 1-hop) within its coverage so as to orchestrate the usage of common communication channel resources and coordinate the RAT selection so as to reduce congestion (and interference, from RAT perspective). To this end, the depicted fields of FIG. 8 may be used in, for example, the protocol flow example of FIG. 9. It will be noted that not all fields depicted with respect to the container 800 may be exchanged each time, and rather various fields will be used at different times during the use of the protocol flow of FIG. 9.

Figure 9:
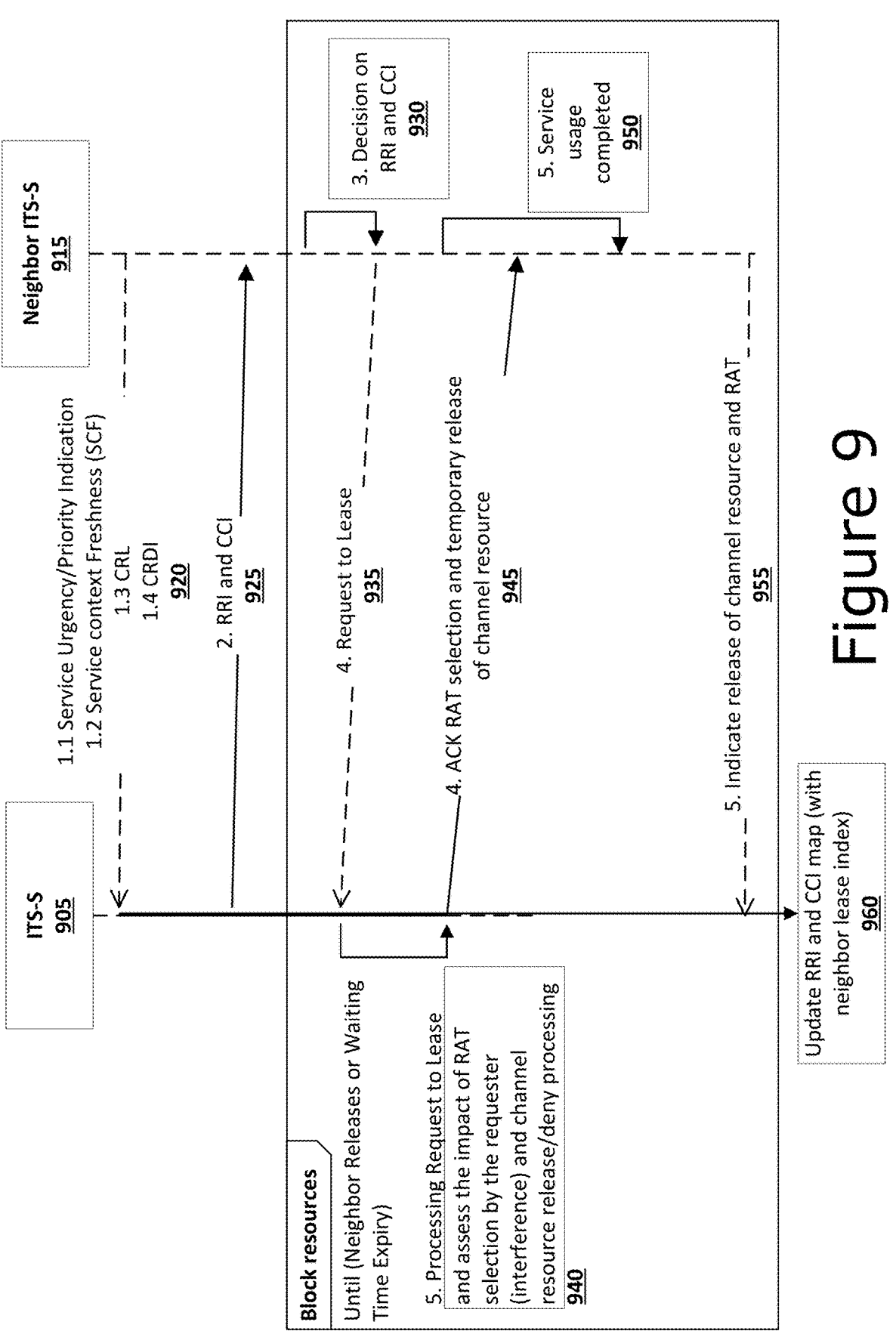
FIG. 9 depicts an example of collaborative resource orchestration, in accordance with various embodiments.

FIG. 9 generally relates to resource leasing. That is, once such information is exchanged using the container 800, an actor with lower priority or service urgency may lease some of the channel resources (temporarily) to facilitate another actor with higher service urgency or priority for the indicated period of time (within the collaborative resource orchestration container). Note that the actors involved in such collaborative resource orchestration may not be necessarily operating on the same RAT.

Specifically, FIG. 9 depicts an example of collaborative resource orchestration, in accordance with various embodiments. More specifically, the protocol flow depicts communication between an ITS-S 905 and a neighbor ITS-S 915. The protocol flow may depict transmission, at 920 from the neighbor ITS-S 915 to the ITS-S 905, of one or more parameters such as a service urgency/priority indication (SPI), a service context freshness (SCF) indication, a CRL indication, a channel resource deficit indication (CRDI), etc. Based on the information provided at 1.1, the ITS-S may identify a RAT recommendation indication RRI and/or a channel recommendation indication CCI (for example, through the use of Algorithm 1 as described above).

One or more radio resources may be blocked for ITS communication based on the RRI and/or CCI, and the neighbor ITS-S may provide a decision on the RRI and CCI at 930. Specifically, the decision may relate to whether to use the indicated radio or channel resources. If the neighbor ITS-S 915 decides to use the indicated resources, the neighbor ITS-S may provide a request at 935 to the ITS-S 905 to lease all or a portion of the identified resources.

Based on the request, the ITS-S 905 may process, at 940, the request to assess the impact of RAT selection by the neighbor ITS-S 915 (e.g., whether the level of interference that would result from transmission on those resources is acceptable), and identify whether to release the requested resources or deny use of the requested resources.

If the ITS-S 905 decides to release the resources, the ITS-S may provide an acknowledgement (ACK) at 945 of the RAT selection and temporarily release the requested channel resource. The neighbor ITS-S 915 may use the leased resources until such usage is completed at 950, and then provide an indication to release the resources at 955. After the resources are released at 955, the resources may be unblocked and the ITS-S 905 may update the RRI and CCI map using the neighbor lease index. Specifically, at 955, the neighbor ITS-S 915 who is leasing the resource indicates that the channel resources (indicated in corresponding CCI) and the RAT (indicated in corresponding RRI) are now available for use by the ego-actor/ITS-S 905. The ego-ITS-S 905 may update its RRI and CCI map or table that it keeps maintaining/updating with the neighbor's index because there could be multiple neighboring actors 915 whose RRI/ CCIs need to be updated/maintained dynamically. This way, the ego-actor 905 is able to maintain an up-to-date 'Resource Leasing Availability Look-up table' which it can use to lease to the neighboring actors 915 at their request.

2.2.5. Extended Embodiment: MCO

So far, embodiments of section 2.2 and its subsections have been described with respect to SCO. However, other embodiments may relate to MCO aspects when more than one channel (within the same band or different band) are available or needed for transmission of larger messages (e.g. CPM, DENM, SPATEM, MAPTEM, etc.). Such embodiments may include one or more of the following aspects. It will be noted that, with respect to discussion of SCO, various entities were described with reference to DCC (e.g., DCC_CROSS, DCC_FAC, etc.). In terms of discussion with respect to MCO, such entities may be replaced by MCO-related logical entities such as MCO_CROSS, MCO_FAC, etc.:

MCO_FAC may receive the applications services triggering instructions and handle the distribution of the messages to the appropriate channels with an additional dimension for indicating multiple channel (index) in Algorithm 1 as described with respect to FIG. 7.

The notion of DCC_CROSS, DCC_FAC, DCC NET and DCC_ACC may be extended to be applicable to multiple channel operation by introducing corresponding entities MCO_CROSS, MCO_FAC, MCO NET and MCO ACC, respectively. Hereby, for corresponding to T number of accesses technologies $\{ACC_1, ACC_2, \ldots, ACC_T\}$ and C number of channels, $\{MCO_a, MCO_b, MCO_C\}$, there may be up to C DCC entities corresponding to the number of channels as $\{DCC_1, DCC_2, \ldots, DCC_C\}$ where each $DCC_k$, $\forall k = \{1, 2, \ldots, C\}$ can operate independently or in a coordinated fashion with each other with the MCO_CROSS as the common management entity across all C DCC entities. In another variation, all such DCCs could be combined into the existing single channel DCC entity as an evolved DCC for MCO, denoted by DCC MCO that can be part of the MCO_FAC.

Also, for the various classes of messages associated to different MCO strategies: {Basic Broadcast (BB), Advanced Broadcast (AB) and Advanced Groupcast (AG)}, the solutions described herein may be extended by extending the TC concept of the current disclosure to specifically cover for the above three categories of BB, AB and AG and can be a part of MCO_FAC with the possible underling entity options for DCC as described above.

The collaborative resource orchestration protocol for DCC may also be extended to MCO where all the actors involved can periodically measure and exchange the channel load that they sense, on all the channels of interest.

Various other elements of this disclosure such as problem formulation, framework, concepts, configurations, protocols, parameters, DFs, DEs, etc. may thus be readily applied/ extended to MCO.

2.2.6. Summary

Figure 10:
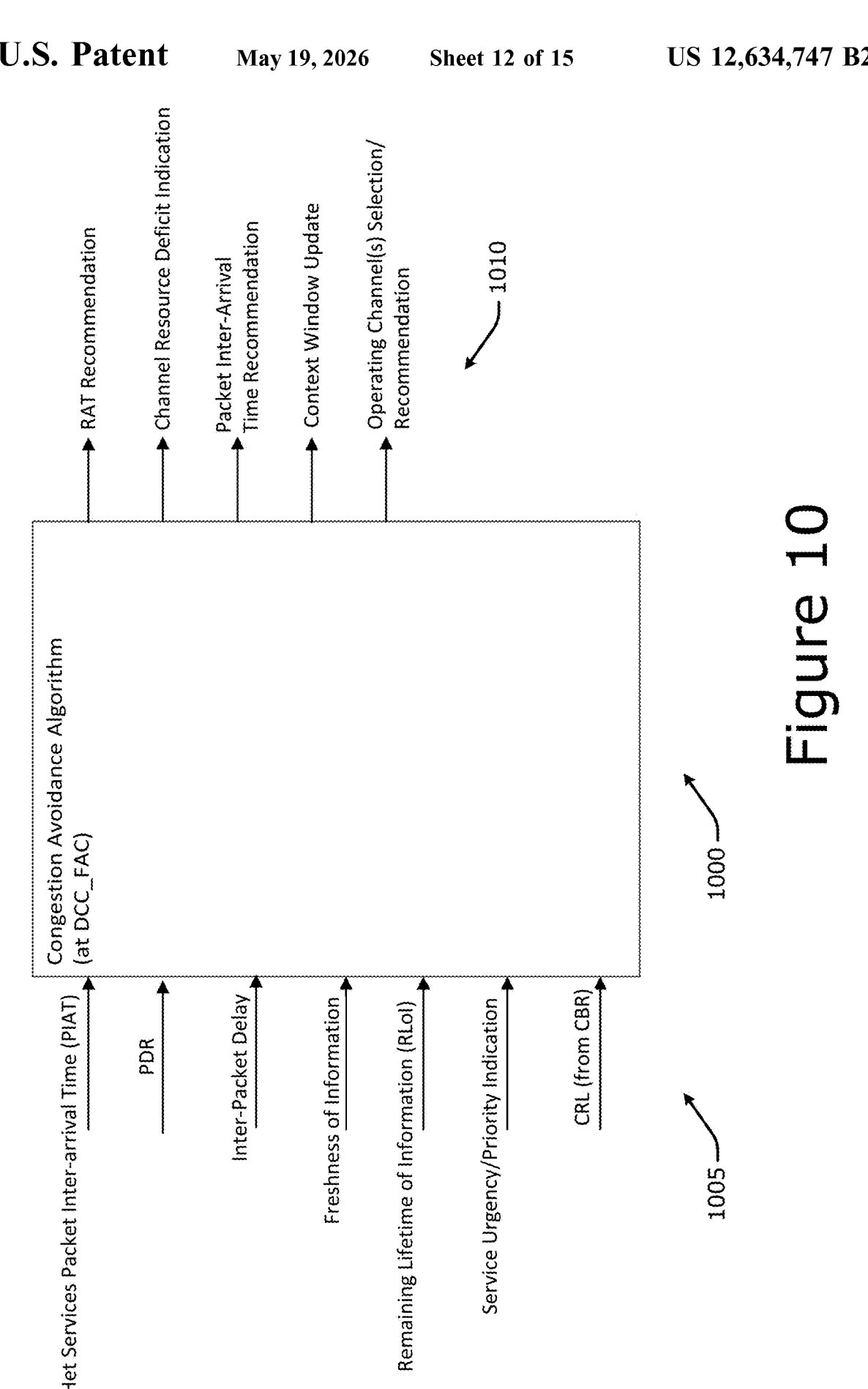
FIG. 10 depicts an example functional representation of a congestion avoidance algorithm, in accordance with various embodiments.

FIG. 10 depicts an example summary diagram of the DCC mechanisms discussed herein, including extensions to MCO. Specifically FIG. 10 depicts a functional representation of inputs 1005 and outputs 1010 after processing by an algorithm 1000 which may be, for example, Algorithm 1 as described above.

FIG. 11 depicts an alternative example technique to be performed by an ITS-S architecture, in accordance with various embodiments. Specifically, the technique of FIG. 11 may be performed by the ITS-S architecture of FIG. 5, the architecture of FIG. 7, or some other entity. It will be noted that in some embodiments the technique of FIG. 11 may be performed by SCO-related elements of the architecture (e.g., the DCC_CROSS, the DCC_FAC, etc.) while in other embodiments the technique of FIG. 11 may be performed by MCO-related elements (e.g., the MCO_CROSS, the MCO_FAC, etc.). More specifically, the technique of FIG. 11 may be performed by a FAC entity, although in other embodiments at least portions of the technique may be performed by additional or alternative ITS-S logical entities.

The technique may include identifying, at 1105 based on a RAT-related indication received from a CROSS entity (e.g., the DCC_CROSS or MCO_CROSS), an available CBR percentage per radio channel of a wireless connection between an ITS-S and another ITS entity. The RAT-related indication may be, for example, the indication of CBR 537 of FIG. 5.

The technique may further include identifying, at 1110, a freshness factor related to respective messages that are to be transmitted on a wireless connection by the ITS-S. The freshness factor may be, for example, the freshness factor described above with respect to element 433. Specifically, the freshness factor may be or relate to a factor such as RLOI, freshness of information, a weight applied to RLOI or freshness of information, etc.

The technique may further include calculating, at 1115 based on the CBR and the freshness factor, a minimum inter-message interval for respective applications and respective traffic classes of the wireless connection. Such an interval may be, for example, $T_{off\ min\ ij}$ as described above.

The technique may further include providing, at 1120 to the CROSS entity, an indication of the minimum inter-message intervals for the respective applications and respective traffic classes. Such a provision may be similar to that of element 538, described above.

It will be understood that this technique is intended as an example technique, and other techniques may be different in other embodiments. For example, certain elements of the technique of FIG. 11 may be performed in a different order than depicted, concurrently with one another, or otherwise vary in some other respect.

3. Hardware Components

FIG. 12 depicts an example vehicle computing system 1200. In this example, the vehicle computing system 1200 includes a V-ITS-S 1201 and Electronic Control Units (ECUs) 1274. The V-ITS-S 1201 includes a V-ITS-S gateway 1211, an ITS-S host 1212, and an ITS-S router 1213. The vehicle ITS-S gateway 1211 provides functionality to connect the components at the in-vehicle network (e.g., ECUs 1274) to the ITS station-internal network. The interface to the in-vehicle components (e.g., ECUs 1274) may be the same or similar as those discussed herein (see e.g., IX 1356 of FIG. 13) and/or may be a proprietary interface/interconnect. Additionally or alternatively, the ITS-S gateway 1211 interconnects, at the facilities layer 202, an OSI protocol stack at OSI layers 5 to 7. The OSI protocol stack is typically is connected to the system network, and the ITSC protocol stack is connected to the ITS station-internal network. The ITS-S gateway 1211 is capable of converting protocols. This allows an ITS-S 1201 to communicate with external elements of the system in which it is implemented.

Access to components (e.g., ECUs 1274) may be implementation specific. The ECUs 1274 may be the same or similar to the driving control units (DCUs) 174 discussed previously with respect to FIG. 1. The ITS station 1201 connects to ITS ad hoc networks via the ITS-S router 1213. The ITS-S router 1213 provides the functionality the ITS-S reference architecture 200 excluding the Applications and Facilities layers 1201 and 1202. The ITS-S router 1213 interconnects two different ITS protocol stacks at layer 3. The ITS-S router 1213 may be capable to convert protocols. One of these protocol stacks typically is connected to the ITS station-internal network.

The local device sensor system and IoT Platform 1205 collects and shares IoT data. The VRU sensor system and IoT Platform 1205 is at least composed of the PoTi management function present in each ITS-S of the system (see e.g., ETSI EN 302 890-2 ("[EN302890-2]")). The PoTi entity provides the global time common to all system elements and the real time position of the mobile elements. Local sensors may also be embedded in other mobile elements as well as in the road infrastructure (e.g., camera in a smart traffic light, electronic signage, etc.). An IoT platform, which can be distributed over the system elements, may contribute to provide additional information related to the environment surrounding the VRU system 2400. The sensor system 1205 can include one or more cameras, radars, LiDARs, gyroscope(s), accelerometer(s), and/or other sensors (see e.g., 1322 of FIG. 13), The (local) sensor data fusion function and/or actuator applications 1204 provides the fusion of local perception data obtained from the VRU sensor system and/or different local sensors. This may include aggregating data flows issued by the sensor system and/or different local sensors. The local sensor fusion and actuator application(s) 1204 may contain machine learning (ML)/Artificial Intelligence (AI) algorithms and/or models. Sensor data fusion usually relies on the consistency of its inputs and then to their timestamping, which correspond to a common given time. The sensor data fusion and/or ML/AL techniques may be used to implement the various embodiments discussed herein. Additionally or alternatively, the local sensor fusion and actuator application(s) 1204 may include suitable data fusion and/or data integration technique(s) such as direct fusion technique(s) and/or an indirect fusion technique(s).

A local perception function (which may or may not include trajectory prediction application(s)) 1202 is provided by the local processing of information collected by local sensor(s) associated to the system element. The local perception (and trajectory prediction) function 1202 consumes the output of the sensor data fusion application/function 1204, and feeds ITS-S applications with the perception data (and/or trajectory predictions). The local perception (and trajectory prediction) function 1202 detects and characterize objects (static and mobile) which are likely to cross the trajectory of the considered moving objects.

The motion dynamic prediction function 1203 is related to the behavior prediction of the considered moving objects. The motion dynamic prediction function 1203 predicts the trajectory of the vehicle 110. The motion dynamic prediction function 1203 may be part of a trajectory interception module, a dead reckoning module, and/or the movement detection module of the V-ITS-S 110. Alternatively, the motion dynamic prediction functions 1203 may provide motion/movement predictions to the aforementioned modules. Additionally or alternatively, the motion dynamic prediction function 1203 predicts respective trajectories of corresponding vehicles 110 and/or VRUs 116, which may be used to assist in performing dead reckoning and/or assist the V-ITS-S 110 with VRU Trajectory and Behavioral Modeling entity.

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 116/117 are moving, they still have a large amount of possible motion dynamics in terms of possible trajectories and velocities. This means that motion dynamic prediction 1203 is used to identify which motion dynamic will be selected by the VRU 116 as quickly as possible, and if this selected motion dynamic is subject to a risk of collision with another VRU or a vehicle.

The motion dynamic prediction function 1203 analyzes the evolution of mobile objects and the potential trajectories that may meet at a given time to determine a risk of collision between them. The motion dynamic prediction works on the output of cooperative perception considering the current trajectories of considered device (e.g., VRU device 117) for the computation of the path prediction; the current velocities and their past evolutions for the considered mobiles for the computation of the velocity evolution prediction; and the reliability level which can be associated to these variables. The output of this function is provided to a risk analysis function.

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 117) navigation system, which provides assistance to the user (e.g., VRU 116) to select the best trajectory for reaching its planned destination. With the development of Mobility as a Service (MaaS), multimodal itinerary computation may also indicate to the VRU 116 dangerous areas and then assist to the motion dynamic prediction at the level of the multimodal itinerary provided by the system. In another example, the knowledge of the user (e.g., VRU 116) habits and behaviors may be additionally or alternatively used to improve the consistency and the reliability of the motion predictions. Some users (e.g., VRUs 116/117) follow the same itineraries, using similar motion dynamics, for example when going to the main Point of Interest (POI), which is related to their main activities (e.g., going to school, going to work, doing some shopping, going to the nearest public transport station from their home, going to sport center, etc.). The device (e.g., VRU device 117) or a remote service center may learn and memorize these habits. In another example, the indication by the user (e.g., VRU 116) itself of its selected trajectory in particular when changing it (e.g., using a right turn or left turn signal similar to vehicles when indicating a change of direction).

The vehicle motion control 1208 may be included for computer-assisted and/or automated vehicles 110. Both the HMI entity 1206 and vehicle motion control entity 1208 may be triggered by one or more ITS-S applications. The vehicle motion control entity 1208 may be a function under the responsibility of a human driver or of the vehicle if it is able to drive in automated mode.

The Human Machine Interface (HMI) 1206, when present, enables the configuration of initial data (parameters) in the management entities (e.g., VRU profile management) and in other functions (e.g., VBS management). The HMI 1206 enables communication of external events related to the VBS to the device owner (user), including the alerting about an immediate risk of collision (TTC<2 s) detected by at least one element of the system and signaling a risk of collision (e.g., TTC>2 seconds) being detected by at least one element of the system. In various implementations, the HMI 1206 may be part of the vehicle's alerting system.

The connected system 1207 refers to components/devices used to connect a system with one or more other systems. As examples, the connected systems 1207 may include communication circuitry and/or radio units. Additionally or alternatively, the connected system 1207 may also include an information system that collects, in real time (or near real time), information resulting from events, processes the collected information and stores them together with processed results. At each level, the information collection, processing, and storage is related to the functional and data distribution scenario that is implemented.

Figures 13, 14:
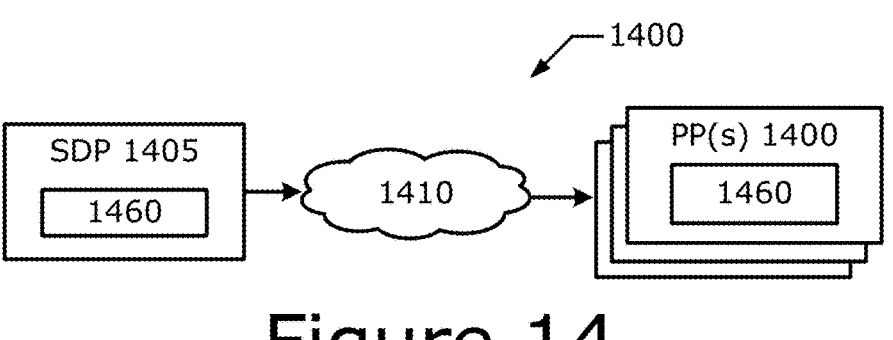
FIG. 13 depicts example components of a compute node, which may be used in edge computing system(s).
FIG. 14 illustrates an example software distribution platform.

FIG. 13 illustrates an example of components that may be present in a computing node 1350 for implementing the techniques (e.g., operations, processes, methods, and methodologies) described herein. The compute node 1350 provides a closer view of the respective components of node 1300 when implemented as or as part of a computing device (e.g., as a mobile device, a base station, server, gateway, etc.). The compute node 1350 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1350, or as components otherwise incorporated within a chassis of a larger system.

In some embodiments, compute node 1350 may correspond to the vehicles 110, VRU system 117, NAN 130, edge compute node 140, and/or server(s) 160 of FIG. 1; vehicle computing system 1200 of FIG. 12; software distribution platform 1405 and/or processor platform(s) 1400 of FIG. 14; CUs, DUs, and/or remote units (RUs) of a 3GPP-based CU/DU split RAN architecture; MEC hosts/servers and/or MEC platforms in ETSI MEC implementations; 3GPP edge computing; EAS, EES, and/or ECS of a 3GPP edge computing architecture; Non-RT RIC, Near-RT RIC, and/or E2 nodes in O-RAN implementations; and/or any other component, device, and/or system discussed herein. The compute node 1350 may be embodied as a type of device, appliance, computer, or other "thing" capable of communicating with other edge, networking, or endpoint components. For example, compute node 1350 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1350 includes processing circuitry in the form of one or more processors 1352. The processor circuitry 1352 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1352 may include one or more hardware accelerators (e.g., same or similar to acceleration circuitry 1364), which may be microprocessors, programmable processing devices (e.g., FPGA, ASIC, etc.), or the like. The one or more accelerators may include, for example, computer vision and/or deep learning accelerators. In some implementations, the processor circuitry 1352 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1352 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1352 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1352 may work in coordination with each other to execute many types of operations and instructions within and on behalf of the compute node 1350.

The processors (or cores) 1352 may be coupled with or may include memory/storage and may be configured to execute instructions stored in the memory/storage to enable various applications or operating systems to run on the platform 1350. The processors (or cores) 1352 is configured to operate application software to provide a specific service to a user of the platform 1350. Additionally or alternatively, the processor(s) 1352 may be a special-purpose processor(s)/controller(s) configured (or configurable) to operate according to the elements, features, and implementations discussed herein.

As examples, the processor(s) 1352 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1352 may be a part of a system on a chip (SoC), System-in-Package (SiP), a multi-chip package (MCP), and/or the like, in which the processor(s) 1352 and other components are formed into a single integrated circuit, or a single package, such as the Edison™ or Galileo™ SoC boards from Intel® Corporation. Other examples of the processor(s) 1352 are mentioned elsewhere in the present disclosure.

The processor(s) 1352 may communicate with system memory 1354 over an interconnect (IX) 1356. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the IX 1356. In an example, the storage 1358 may be implemented via a solid-state disk drive (SSDD) and/or high-speed electrically erasable memory (commonly referred to as "flash memory"). Other devices that may be used for the storage 1358 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1354 and/or storage circuitry 1358 may also incorporate three-dimensional (3D) cross-point (XPOINT) memories from Intel® and Micron®.

In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components of edge computing device 1350 may communicate over an interconnect (IX) 1356. The IX 1356 may represent any suitable type of connection or interface such as, for example, metal or metal alloys (e.g., copper, aluminum, etc.), fiber, and/or the like. The IX 1356 may include any number of IX, fabric, and/or interface technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1356 may be a proprietary bus, for example, used in a SoC based system.

The IX 1356 couples the processor 1352 to communication circuitry 1366 for communications with other devices, such as a remote server (not shown) and/or the connected edge devices 1362. The communication circuitry 1366 is a hardware element, or collection of hardware elements, used to communicate over one or more networks (e.g., cloud 1363) and/or with other devices (e.g., edge devices 1362).

The transceiver 1366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1366 (or multiple transceivers) may communicate using multiple standards or radios for communications at a different range. For example, the compute node 1350 may communicate with close devices, e.g., within about 10 meters, using a local transceiver based on BLE, or another low power radio, to save power. More distant connected edge devices 1362, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1366 (e.g., a radio transceiver) may be included to communicate with devices or services in the edge cloud 1363 via local or wide area network protocols. The wireless network transceiver 1366 may be an LPWA transceiver that follows the IEEE 802.15.4, or IEEE 802.15.4g standards, among others. The compute node 1363 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1366, as described herein. For example, the transceiver 1366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1366 may include radios that are compatible with any number of 3GPP specifications, such as LTE and 5G/NR communication systems, discussed in further detail at the end of the present disclosure. A network interface controller (NIC) 1368 may be included to provide a wired communication to nodes of the edge cloud 1363 or to other devices, such as the connected edge devices 1362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1368 may be included to enable connecting to a second network, for example, a first NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1364, 1366, 1368, or 1370. Accordingly, in various examples, applicable means for communicating (e.g., receiving, transmitting, etc.) may be embodied by such communications circuitry.

The compute node 1350 may include or be coupled to acceleration circuitry 1364, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1364 may comprise logic blocks or logic fabric and other interconnected resources that may be programmed (configured) to perform various functions, such as the procedures, methods, functions, etc. discussed herein. In such implementations, the acceleration circuitry 1364 may also include memory cells (e.g., EPROM, EEPROM, flash memory, static memory (e.g., SRAM, anti-fuses, etc.) used to store logic blocks, logic fabric, data, etc. in LUTs and the like.

The IX 1356 also couples the processor 1352 to a sensor hub or external interface 1370 that is used to connect additional devices or subsystems. The additional/external devices may include sensors 1372, actuators 1374, and positioning circuitry 1375.

The sensor circuitry 1372 includes devices, modules, or subsystems whose purpose is to detect events or changes in its environment and send the information (sensor data) about the detected events to some other a device, module, subsystem, etc. Examples of such sensors 1372 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1350); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1374, allow platform 1350 to change its state, position, and/or orientation, or move or control a mechanism or system. The actuators 1374 comprise electrical and/or mechanical devices for moving or controlling a mechanism or system, and converts energy (e.g., electric current or moving air and/or liquid) into some kind of motion. The actuators 1374 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1374 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1350 may be configured to operate one or more actuators 1374 based on one or more captured events and/or instructions or control signals received from a service provider and/or various client systems.

The positioning circuitry 1375 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1375 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1375 may include a Micro-Technology for Positioning, Navigation, and Timing (Micro-PNT) IC that uses a master timing clock to perform position tracking/estimation without GNSS assistance. The positioning circuitry 1375 may also be part of, or interact with, the communication circuitry 1366 to communicate with the nodes and components of the positioning network. The positioning circuitry 1375 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1375 is, or includes an INS, which is a system or device that uses sensor circuitry 1372 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1350 without the need for external references.

In some optional examples, various input/output (I/O) devices may be present within or connected to, the compute node 1350, which are referred to as input circuitry 1386 and output circuitry 1384 in FIG. 13. The input circuitry 1386 and output circuitry 1384 include one or more user interfaces designed to enable user interaction with the platform 1350 and/or peripheral component interfaces designed to enable peripheral component interaction with the platform 1350. Input circuitry 1386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1384 may be included to show information or otherwise convey information, such as sensor readings, actuator position(s), or other like information. Data and/or graphics may be displayed on one or more user interface components of the output circuitry 1384. Output circuitry 1384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1350. The output circuitry 1384 may also include speakers or other audio emitting devices, printer(s), and/or the like. Additionally or alternatively, the sensor circuitry 1372 may be used as the input circuitry 1384 (e.g., an image capture device, motion capture device, or the like) and one or more actuators 1374 may be used as the output device circuitry 1384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1376 may power the compute node 1350, although, in examples in which the compute node 1350 is mounted in a fixed location, it may have a power supply coupled to an electrical grid, or the battery may be used as a backup or for temporary capabilities. The battery 1376 may be a lithium ion battery, or a metal-air battery, such as a zinc-air battery, an aluminum-air battery, a lithium-air battery, and the like.

A battery monitor/charger 1378 may be included in the compute node 1350 to track the state of charge (SoCh) of the battery 1376, if included. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1378 may communicate the information on the battery 1376 to the processor 1352 over the IX 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the compute node 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the compute node 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1383 in the form of software, firmware, or hardware commands to implement the techniques described herein. Although such instructions 1382, 1383 are shown as code blocks included in the memory 1354 and the storage 1358, any of the code blocks 1382, 1383 may be replaced with hardwired circuits, for example, built into an application specific integrated circuit (ASIC) or programmed into an FPGA, or the like.

In an example, the instructions 1381, 1382, 1383 provided via the memory 1354, the storage 1358, or the processor 1352 may be embodied as a non-transitory machine-readable medium (NTMRM) 1360 including code to direct the processor 1352 to perform electronic operations in the compute node 1350. The processor 1352 may access the NTMRM 1360 over the IX 1356. For instance, the NTMRM 1360 may be embodied by devices described for the storage 1358 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1360 may include instructions to direct the processor 1352 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1381, 1382, 1383) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1381, 1382, 1383 for carrying out operations of the present disclosure may also be written in any combination of the programming languages discussed herein. The program code may execute entirely on the system 1350, partly on the system 1350, as a stand-alone software package, partly on the system 1350 and partly on a remote computer or entirely on the remote computer or server. In the latter scenario, the remote computer may be connected to the system 1350 through any type of network, including a LAN or WAN, or the connection may be made to an external computer (e.g., through the Internet using an Internet Service Provider).

In an example, the instructions 1381, 1382, 1383 on the processor circuitry 1352 (separately, or in combination with the instructions 1381, 1382, 1383) may configure execution or operation of a trusted execution environment (TEE) 1390. The TEE 1390 operates as a protected area accessible to the processor circuitry 1302 to enable secure access to data and secure execution of instructions. In some embodiments, the TEE 1390 may be a physical hardware device that is separate from other components of the system 1350 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1390 may be implemented as secure enclaves, which are isolated regions of code and/or data within the processor and/or memory/storage circuitry of the system 1350. Only code executed within a secure enclave may access data within the same secure enclave, and the secure enclave may only be accessible using the secure application (which may be implemented by an application processor or a tamper-resistant microcontroller). Various implementations of the TEE 1390, and an accompanying secure area in the processor circuitry 1352 or the memory circuitry 1354 and/or storage circuitry 1358 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1300 through the TEE 1390 and the processor circuitry 1352. Additionally or alternatively, the memory circuitry 1354 and/or storage circuitry 1358 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1304 and/or storage circuitry 1308 may be divided into one or more trusted memory regions for storing applications or software modules of the TEE 1390.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

In one example, the compute node 1350 is a self-contained electronic device including a housing, a chassis, a case or a shell, which may be referred to as an "appliance". In some circumstances, the housing may be dimensioned for portability such that it can be carried by a human and/or shipped. Additionally or alternatively, the housing may be a smaller module suitable for installation in a vehicle for example. The housing may include materials that form one or more exterior surfaces that partially or fully protect contents of the appliance, in which protection may include weather protection, hazardous environment protection (e.g., EMI, vibration, extreme temperatures), and/or enable submergibility. The appliance may include power circuitry (e.g., battery monitor/charger 1378 and/or power block 1380) to provide power for stationary and/or portable implementations, such as AC power inputs, DC power inputs, AC/DC or DC/AC converter(s), power regulators, transformers, charging circuitry, batteries 1376, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). The housing and/or surfaces thereof may support one or more sensors 1372 (e.g., temperature sensors, vibration sensors, light sensors, acoustic sensors, capacitive sensors, proximity sensors, etc.). One or more such sensors 1372 may be contained in, carried by, or otherwise embedded in the surface and/or mounted to the surface of the housing/appliance. The housing and/or surfaces thereof may support mechanical connectivity, such as propulsion hardware 1374 (e.g., wheels, propellers, etc.) and/or articulating hardware 1374 (e.g., robot arms, pivotable appendages, etc.). In some circumstances, the sensors may include any type of input devices 1386 such as user interface hardware (e.g., buttons, switches, dials, sliders, etc.). In some circumstances, the housing includes output devices 1384 contained in, carried by, embedded therein and/or attached thereto. Output devices 1384 may include displays, touchscreens, lights, LEDs, speakers, I/O ports (e.g., USB), etc. In some circumstances, compute node 1350 are devices presented in the network for a specific purpose (e.g., a traffic light), but may have processing and/or other capacities that may be utilized for other purposes. Such compute node 1350 may be independent from other networked devices and may be provided with a housing having a form factor suitable for its primary purpose; yet be available for other compute tasks that do not interfere with its primary task. The appliance computing device 1350 may include hardware and software components to manage local issues such as device temperature, vibration, resource utilization, updates, power issues, physical and network security, etc. The appliance computing device 1350 may be part of an edge cloud including one or more servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

FIG. 13 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 14 illustrates an example software (SW) distribution platform (SDP) 1405 to distribute software 1460, such as the example computer readable instructions 1381, 1382, 1383 of FIG. 13, to one or more devices, such as example processor platform(s) (pp) 1400, connected edge devices 1362 (see e.g., FIG. 13), and/or any of the other computing systems/devices discussed herein. The SDP 1405 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1362 of FIG. 13). The SDP 1405 (or components thereof) may be located in a cloud (e.g., data center, etc.), a local area network, an edge network, a wide area network, on the Internet, and/or any other location communicatively coupled with the pp 1400.

The pp 1400 and/or connected edge devices 1362 connected edge devices 1362 may include customers, clients, managing devices (e.g., servers), third parties (e.g., customers of an entity owning and/or operating the SDP 1405), IoT devices, and the like. The pp 1400/connected edge devices 1362 may operate in commercial and/or home automation environments. In some examples, a third party is a developer, a seller, and/or a licensor of software such as the example computer readable media 1381, 1382, 1383 of FIG. 13. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 1400/connected edge devices 1362 can be physically located in different geographic locations, legal jurisdictions, etc.

In FIG. 14, the SDP 1405 includes one or more servers (referred to as "servers 1405") and one or more storage devices (referred to as "storage 1405"). The storage 1405 store the computer readable instructions 1460, which may correspond to the instructions 1381, 1382, 1383 of FIG. 13. The servers 1405 are in communication with a network 1410, which may correspond to any one or more of the Internet and/or any of the example networks as described herein. The servers 1405 are responsive to requests to transmit the software to a requesting party as part of a commercial transaction. Payment for the delivery, sale and/or license of the software may be handled by the servers 1405 and/or via a third-party payment entity. The servers 1405 enable purchasers and/or licensors to download the computer readable instructions 1460 from the SDP 1405.

The servers 1405 are communicatively connected to one or more security domains and/or security devices through which requests and transmissions of the example computer readable instructions 1460 must pass. Additionally or alternatively, the servers 1405 periodically offer, transmit, and/or force updates to the software 1460 to ensure improvements, patches, updates, etc. are distributed and applied to the software at the end user devices. The computer readable instructions 1460 are stored on storage 1405 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1460 stored in the SDP 1405 are in a first format when transmitted to the pp 1400. Additionally or alternatively, the first format is an executable binary in which particular types of the pp 1400 can execute. Additionally or alternatively, the first format is uncompiled code that requires one or more preparation tasks to transform the first format to a second format to enable execution on the pp 1400. For example, the receiving pp 1400 may need to compile the computer readable instructions 1460 in the first format to generate executable code in a second format that is capable of being executed on the pp 1400. Additionally or alternatively, the first format is interpreted code that, upon reaching the pp 1400, is interpreted by an interpreter to facilitate execution of instructions. Additionally or alternatively, different components of the computer readable instructions 1382 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

4. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method to be implemented by an ITS-station (ITS-S), the method comprising: identifying, by a facilities layer (FAC) entity of the ITS-S based on a RAT-related indication received from a cross-layer management (CROSS) entity of the ITS-S, an available CBR percentage per radio channel of a wireless connection between the ITS-S and another ITS entity; identifying, by the FAC entity, a freshness factor related to respective messages that are to be transmitted on a wireless connection by the ITS-S; calculating, by the FAC entity based on the CBR and the freshness factor, a minimum inter-message interval for respective applications and respective traffic classes of the wireless connection; and providing, by the FAC entity to the CROSS entity, an indication of the minimum inter-message intervals for the respective applications and respective traffic classes.

Example 2 includes the method of example 1, or some other example herein, wherein the RAT-related indication includes context-related information of a RAT on which the respective messages are to be transmitted.

Example 3 includes the method of any of examples 1-2, or some other example herein, wherein the context-related information includes position, speed, or heading of nodes within a vicinity of the ITS-S that are configured to communicate on the RAT.

Example 4 includes the method of any of examples 1-3, or some other example herein, wherein the CROSS entity is to identify, based on the indication of the minimum inter-message intervals for the respective applications and respective traffic classes, a channel resource limit (CRL) for a channel of the wireless connection.

Example 5 includes the method of any of examples 1-4, or some other example herein, wherein the CROSS entity is further to allocate, for a channel related to the CRL, a proportion of an available channel resource (CR) for transmission of the respective messages.

Example 6 includes the method of any of examples 1-5, or some other example herein, wherein the CR includes a resource temporarily leased from another node within a vicinity of the ITS-S.

Example 7 includes the method of any of examples 1-6, or some other example herein, wherein the channel is a first channel, and wherein the CROSS entity is further to identify, based on the indication of the minimum inter-message intervals for the respective applications and respective traffic classes, a second CRL for a second channel of the wireless connection.

Example 8 includes the method of any of examples 1-7, or some other example herein, wherein the freshness factor is a freshness of information parameter or a RLoI parameter.

Example 9 includes the method of any of examples 1-8, or some other example herein, wherein the freshness factor further includes a weight applied to the freshness of information parameter or a weight applied to the RLoI parameter.

Example 10 includes the method of any of examples 1-9, or some other example herein, wherein the CROSS entity is a MCO_CROSS (MCO_CROSS) entity or a DCC_CROSS (DCC_CROSS) entity.

Example 11 includes the method of any of examples 1-10, or some other example herein, wherein the FAC entity is a MCO_FAC (MCO_FAC) entity or a DCC_FAC (DCC_FAC) entity.

Example 12 includes a method to be implemented by an ITS-station (ITS-S), the method comprising: identifying, by the ITS-S, a plurality of ITS service messages that are to be transmitted on a primary channel of a wireless network, wherein the ITS service messages include a first ITS service message and a second ITS service message; identifying, by the ITS-S, that the second ITS service message is to be offloaded to a secondary channel; facilitating, by the ITS-S, transmission of a subset of the ITS service messages of the plurality of ITS service messages on the primary channel, wherein the subset of the ITS service messages includes the first ITS service message and does not include the second ITS service message; and facilitating, by the ITS-S, transmission of the second ITS service message on the secondary channel.

Example 13 includes the method of example 12, or some other example herein, wherein the plurality of ITS service messages include a MCM, a DENM, a CPM, a CAM, or an ITS MCO assistance message (MAS).

Example 14 includes the method of any of examples 12-13, or some other example herein, wherein the MAS includes information related to a location of SAEMs that are not transmitted on the primary channel.

Example 15 includes the method of any of examples 12-14, or some other example herein, wherein a SAEM of the SAEMs has a periodicity based on active message services of a cooperative ITS-S(C-ITS-S) that transmitted the SAEM.

Example 16 includes the method of any of examples 12-15, or some other example herein, wherein a SAEM of the SAEMs has a periodicity based on a sub-integer multiple of a smallest periodicity among periodicities of the MCM, DENM, CPM, or CAM.

Example 17 includes the method of any of examples 12-16, or some other example herein, wherein a grouping of applications to which the SAEM relates are based on whether the SAEM is transmitted on the primary channel or the secondary channel.

Example 18 includes the method of any of examples 12-17, or some other example herein, wherein a grouping of applications to which the SAEM relates are based on whether a receiver related to an application of the grouping of applications is monitoring the primary channel or the secondary channel.

Example 19 includes the method of any of examples 12-18, or some other example herein, wherein identification that the second ITS-S service message is to be offloaded to the secondary channel is based on a comparison of a priority of the second ITS-S service message to respective priorities of other ITS-S service messages of the plurality of ITS-S service messages.

Example 20 includes the method of any of examples 12-19, or some other example herein, wherein identification that the second ITS-S service message is to be offloaded to the secondary channel is based on an identification that the priority of the second ITS-S service message is lower than a priorities of another of the plurality of ITS-S service messages.

Example 21 includes the method of any of examples 12-20, or some other example herein, wherein identification that the first ITS-S service message is to be transmitted on the primary channel is based on an identification that a priority of the first ITS-S service message is higher than a priority of another of the plurality of ITS-S service messages.

Example 22 includes the method of any of examples 12-21, or some other example herein, wherein a priority of an ITS service message of the plurality of ITS-S service messages is based on whether it is related to one of a safety service, an awareness service, and a collaboration service Example 23 includes the method of any of examples 12-22, or some other example herein, wherein a priority of an ITS service message of the plurality of ITS-S service messages is based on an identification that the ITS service message includes application-related or service-related crucial content.

Example 24 includes the method of any of examples 12-23, or some other example herein, wherein the primary channel is a broadcast channel.

Example 25 includes the method of any of examples 12-24, or some other example herein, wherein the secondary channel is a broadcast channel, a unicast channel, or a groupcast channel.

Example 26 includes the method of any of examples 12-25, or some other example herein, wherein identification that the second ITS service message is to be offloaded to a secondary channel is based on an identification that a channel bandwidth required to transmit the plurality of ITS service messages exceeds an available bandwidth of the primary channel.

Example 27 includes the method of any of examples 12-26, or some other example herein, wherein the available bandwidth is based on reserved bandwidth for event triggered high-priority message arrivals.

Example 28 includes the method of any of examples 12-27, or some other example herein, wherein the available bandwidth is based on information received by the ITS-S from a neighbor ITS-S.

Example 29 includes the method of any of examples 12-28, or some other example herein, wherein the method further comprises: identifying, by the ITS-S based on a size of a third ITS service message of the plurality of ITS service messages, that the third ITS service message is to be transmitted on the secondary channel; adjusting, by the ITS-S, a message rate or size of the third ITS service message to generate an adjusted third ITS service message; and identifying, by the ITS-S based on a size of the adjusted third ITS service message, that the third ITS service message is to be transmitted on the primary channel.

Example 30 includes the method of any of examples 12-29, or some other example herein, wherein the primary channel is a primary channel of a plurality of primary channels, wherein respective primary channels of the plurality of primary channels are related to different ITS safety applications or ITS services.

Example 31 includes a method to be performed by a facilities layer (FAC) entity of an intelligent transport system (ITS)-station (ITS-S), the method comprising: identifying, by the FAC entity based on a radio access technology (RAT)-related indication received from a cross-layer management (CROSS) entity, an available channel busy ratio (CBR) percentage per radio channel of a wireless connection between the ITS-S and another ITS entity; identifying, by the FAC entity, a freshness factor related to respective messages that are to be transmitted on a wireless connection by the ITS-S; calculating, by the FAC entity based on the CBR and the freshness factor, a minimum inter-message interval for respective applications and respective traffic classes of the wireless connection; and providing, by the FAC entity to the CROSS entity, an indication of the minimum inter-message intervals for the respective applications and respective traffic classes.

Example 32 includes the ITS-S of example 31, or some other example herein, wherein the RAT-related indication includes context-related information of a RAT on which the respective messages are to be transmitted.

Example 33 includes the ITS-S of any of examples 31-32, or some other example herein, wherein the context-related information includes position, speed, or heading of nodes within a vicinity of the ITS-S that are configured to communicate on the RAT.

Example 34 includes the ITS-S of any of examples 31-33, or some other example herein, wherein the CROSS entity is to identify, based on the indication of the minimum inter-message intervals for the respective applications and respective traffic classes, a channel resource limit (CRL) for a channel of the wireless connection.

Example 35 includes the ITS-S of any of examples 31-34, or some other example herein, wherein the CROSS entity is further to allocate, for a channel related to the CRL, a proportion of an available channel resource (CR) for transmission of the respective messages.

Example 36 includes the ITS-S of any of examples 31-35, or some other example herein, wherein the channel is a first channel, and wherein the CROSS entity is further to identify, based on the indication of the minimum inter-message intervals for the respective applications and respective traffic classes, a second CRL for a second channel of the wireless connection.

Example 37 includes the ITS-S of any of examples 31-36, or some other example herein, wherein the freshness factor is a freshness of information parameter or a remaining lifetime of information (RLoI) parameter.

Example 38 includes the ITS-S of any of examples 31-37, or some other example herein, wherein the freshness factor further includes a weight applied to the freshness of information parameter or a weight applied to the RLoI parameter.

Example 39 includes the ITS-S of any of examples 31-38, or some other example herein, wherein the CROSS entity is a multi-channel operation (MCO) CROSS (MCO_CROSS) entity or a decentralized congestion control (DCC) CROSS (DCC_CROSS) entity.

Example 40 includes the ITS-S of any of examples 31-39, or some other example herein, wherein the FAC entity is a multi-channel operation (MCO) FAC (MCO_FAC) entity or a decentralized congestion control (DCC) FAC (DCC_FAC) entity.

Example 41 includes a method to be performed by an edge device, the method comprising: identifying a plurality of service messages to be transmitted on a primary channel of a wireless network; identifying at least one service message of the plurality of service messages to be offloaded to a secondary channel of the wireless network; causing transmission of a set of the service messages of the plurality of service messages on the primary channel, wherein the set of the service messages does not include the at least one service message; and causing transmission of the at least one service message on the secondary channel.

Example 42 includes the method of any of example 41, or some other example herein, wherein identification that the at least one service message is to be offloaded to the secondary channel is based on a comparison of a priority of the at least one service message to respective priorities of other service messages of the plurality of service messages.

Example 43 includes the method of any of examples 41-42, or some other example herein, wherein identification that the at least one service message is to be offloaded to the secondary channel is based on an identification that the priority of the at least one service message is lower than a priority of another service message of the plurality of service messages.

Example 44 includes the method of any of examples 41-43, or some other example herein, wherein identification that a service message of the plurality of service messages is to be transmitted on the primary channel is based on an identification that a priority of the first service message is higher than a priority of another service message of the plurality of service messages.

Example 45 includes the method of any of examples 41-44, or some other example herein, wherein the primary channel is a broadcast channel.

Example 46 includes the method of any of examples 41-45, or some other example herein, wherein the secondary channel is a broadcast channel, a unicast channel, or a groupcast channel.

Example 47 includes the method of any of examples 41-46, or some other example herein, wherein identification that the second service message is to be offloaded to a secondary channel is based on an identification that a channel bandwidth required to transmit the plurality of service messages exceeds an available bandwidth of the primary channel.

Example 48 includes the method of any of examples 41-47, or some other example herein, wherein the method further comprises: identifying, by the based on a size of another service message of the plurality of service messages, that the other service message is to be transmitted on the secondary channel; adjusting a message rate or size of the other service message to generate an adjusted other service message; and identifying, based on a size of the adjusted other service message, that the other service message is to be transmitted on the primary channel.

Example 49 includes the method of any of examples 41-48, or some other example herein, wherein the primary channel is a primary channel of a plurality of primary channels, wherein respective primary channels of the plurality of primary channels are related to different safety applications or services.

Example 50 includes the method of examples 41-49, or some other example herein, wherein the edge device is one of an edge server of an edge computing framework, a network access node (NAN), user equipment (UE), or an Internet of Things (IoT) device.

Example 51 includes the method of examples 41-50, or some other example herein, wherein the edge device is an intelligent transportation system (ITS) station (ITS-S).

Example 52 includes the method of examples 41-51, or some other example herein, wherein the plurality of service messages are ITS service messages, and the plurality of service messages include one or more of a maneuver coordination message (MCM), a decentralized environmental notification message (DENM), a collective perception message (CPM), a cooperative awareness message (CAM), and/or an ITS multi-channel operation (MCO) assistance message (MAS).

Example 53 includes a method to be performed by a cross-layer management (CROSS) entity of an intelligent transportation system (ITS)-station (ITS-S), the method comprising: sending, by the CROSS entity, a radio access technology (RAT)-related indicator to a facilities layer (FAC) entity, the RAT-related indicator for identification of an available channel busy ratio (CBR) percentage per radio channel of a wireless connection between the ITS-S and another ITS entity; and receiving, by the CROSS entity from the FAC entity, an inter-message interval indicator that includes respective minimum inter-message intervals for corresponding applications and corresponding traffic classes, wherein the respective minimum inter-message intervals are based on the CBR and a freshness factor related to respective messages that are to be transmitted on a wireless connection by the ITS-S.

Example 54 includes the method of example 53, or some other example herein, wherein the RAT-related indication includes context-related information of a RAT on which the respective messages are to be transmitted, wherein the context-related information includes position, speed, or heading of nodes within a vicinity of the ITS-S that are configured to communicate on the RAT.

Example 55 includes the method of any of examples 55-54, or some other example herein, wherein the method further comprises: identifying, by the CROSS entity, a first channel resource limit (CRL) for a first channel of the wireless connection based on the inter-message interval indicator for the respective applications and respective traffic classes; identifying, by the CROSS entity, a second CRL for a second channel of the wireless connection based on the inter-message interval indicator for the respective applications and respective traffic classes; and allocating, by the CROSS entity for the first channel or the second channel, a proportion of an available channel resource (CR) for transmission of the respective messages.

Example 56 includes the method of any of examples 53-55, or some other example herein, wherein the freshness factor further includes a weight applied to a freshness of an information parameter or a weight applied to a remaining lifetime of information (RLoI) parameter.

Example 57 includes the method of any of examples 53-56 some other example herein, wherein the CROSS entity is a multi-channel operation (MCO) CROSS (MCO_CROSS) entity or a decentralized congestion control (DCC) CROSS (DCC_CROSS) entity, and the FAC entity is a multi-channel operation (MCO) FAC (MCO_FAC) entity or a decentralized congestion control (DCC) FAC (DCC_FAC) entity.

Example 58 includes one or more computer-readable media comprising instructions, wherein execution of the instructions by processor circuitry is to cause the processor circuitry to perform the method of any one of examples 1-57.

Example 59 includes a computer program comprising the instructions of example 58.

Example 60 includes an Application Programming Interface defining functions, methods, variables, data structures, and/or protocols for the computer program of example 59.

Example 61 includes an API or specification defining functions, methods, variables, data structures, protocols, etc., defining or involving use of any of examples 1-57 or portions thereof, or otherwise related to any of examples 1-57 or portions thereof.

Example 62 includes an apparatus comprising circuitry loaded with the instructions of example 58.

Example 63 includes an apparatus comprising circuitry operable to run the instructions of example 58.

Example 64 includes an integrated circuit comprising one or more of the processor circuitry of example 58 and the one or more computer-readable media of example 58.

Example 65 includes a computing system comprising the one or more computer-readable media and the processor circuitry of example 58.

Example 66 includes an apparatus comprising means for executing the instructions of example 58.

Example 67 includes a signal generated as a result of executing the instructions of example 58.

Example 68 includes a data unit generated as a result of executing the instructions of example 58.

Example 69 includes the data unit of example 66 and/or some other example(s) herein, wherein the data unit is a datagram, network packet, data frame, data segment, a PDU, a Service Data Unit (SDU), a message, or a database object.

Example 70 includes a signal encoded with the data unit of examples 68 and/or 69.

Example 71 includes an electromagnetic signal carrying the instructions of example 68.

Example 72 includes an apparatus comprising means for performing the method of any one of examples 1-57 and/or some other example(s) herein.

Example 73 includes an edge compute node executing a service as part of one or more edge applications instantiated on virtualization infrastructure, the service being related to any of examples 1-57, portions thereof, and/or some other example(s) herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, FPGA, programmable logic controller (PLC), SoC, SiP, MCP, digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine-readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "UE," at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, IoT devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, HUD devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a MAC and physical layer (PHY) interface to the wireless medium (WM). The term "wireless medium" or WM" at least in some embodiments refers to the medium used to implement the transfer of PDUs between peer physical layer (PHY) entities of a wireless LAN.

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, RNC, network access node (NAN), base station, AP, RAN device, RAN node, gateway, server, network appliance, NF, virtualized NF (VNF), and/or the like.

The term "access point" or "AP" at least in some embodiments refers to an entity that contains one station (STA) and provides access to the distribution services, via the WM for associated STAs. An AP comprises a STA and a distribution system access function (DSAF).

The term "base station" at least in some embodiments refers to a network element in a RAN, such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UMTS Terrestrial Radio Access (UTRA) user plane (Packet Data Convergence Protocol (PDCP)/RLC/MAC/PHY) and control plane (RRC) protocol terminations towards a UE, and connected via an S1 interface to the EPC. Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021-07-09)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting RRC, Service Data Adaptation Protocol (SDAP), and/or PDCP protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), MAC, and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on-demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, VMs, software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple intercon-nected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alterna-tively, NFV processing and data storage will occur at the Edge data centers that are connected directly to the local cellular site, within the infrastructure Edge.

The term "virtualized NF" (or VNF) indicates a software-based NF operating on multi-function, multi-purpose com-pute resources (e.g., x86, ARM processing architecture) which are used by NFV in place of dedicated physical equipment. Additionally or alternatively, several VNFs will operate on an Edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security con-structs, containers), and the like. In some locations, a "cluster" is also referred to as a "group" or a "domain". The membership of cluster may be modified or affected based on conditions or functions, including from dynamic or prop-erty-based membership, from network or system manage-ment scenarios, or from various example techniques dis-cussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric ser-vices such as, for example, operator services, the internet, third-party services, or enterprise networks. Additionally or alternatively, a DN at least in some embodiments refers to service networks that belong to an operator or third party, which are offered as a service to a client or UE. DNs are sometimes referred to as "Packet Data Networks" or "PDNs". The term "Local Area Data Network" or "LADN" at least in some embodiments refers to a DN that is acces-sible by the UE only in specific locations, that provides connectivity to a specific Data Network Name (DNN), and whose availability is provided to the UE.

The term "Internet of Things" or "IoT" at least in some embodiments refers to a system of interrelated computing devices, mechanical and digital machines capable of trans-ferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodi-ments refers to technology for wireless transmission and/or reception of electromagnetic radiation for information trans-fer.

The term "radio access technology" or "RAT" at least in some embodiments refers to the technology used for the underlying physical connection to a radio based communi-cation network.

The term "communication protocol" (either wired or wireless) at least in some embodiments refers to a set of standardized rules or instructions implemented by a com-munication device and/or system to communicate with other devices and/or systems, including instructions for packetiz-ing/depacketizing data, modulating/demodulating signals, implementation of protocols stacks, and/or the like.

The term "RAT type" may identify a transmission tech-nology and/or communication protocol used in an access network, for example, NR, LTE, narrowband IoT (NB-IoT), untrusted non-3GPP, trusted non-3GPP, trusted IEEE 802.11, non-3GPP access, MuLTEfire, WiMAX, wireline, wireline-cable, wireline broadband forum (wireline-BBF), etc. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), etc.); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UTRA, Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), etc.), Generic Access Network (GAN)/Unlicensed Mobile Access (UMA), High-Speed Packet Access (HSPA) (and variants thereof such as HSPA Plus (HSPA+), etc.), LTE (and variants thereof such as LTE-Advanced (LTE-A), Evolved UTRA (E-UTRA), LTE Extra, LTE-A Pro, LTE LAA, MuLTEfire, etc.), Fifth-Generation (5G) or NR, etc.; ETSI technologies such as High-Performance Radio Metropolitan Area Network (HiperMAN) and the like; IEEE technologies such as WiFi (IEEE 802.11 and variants thereof), Worldwide Interoperability for Microwave Access (WiMAX) (IEEE 802.16 and variants thereof), Mobile Broadband Wireless Access (MBWA)/iBurst (IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (IEEE 802.11ad, IEEE 802.11ay, etc.), etc.); short-range and/or wireless personal area network (WPAN) technologies/standards such as Bluetooth (and variants thereof such as Bluetooth 5.3, BLE, etc.), IEEE 802.15 technologies/standards (e.g., IEEE 802.15.4 (low rate WPAN), ZigBee, Thread, IPv6 over Low power WPAN (6LoWPAN), WirelessHART, MiWi, ISA100.11a, IEEE 802.15.6 (Body Area Networks (BANs), etc.), WiFi-direct, ANT/ANT+, Z-Wave, 3GPP Proximity Services (ProSe), Universal Plug and Play (UPnP), LPWANs, Long Range Wide Area Network (LoRA or LoRaWAN™), and the like; optical and/or visible light communication (VLC) technologies/standards such as IEEE 802.15.7 and the like; V2X communication including 3GPP cellular V2X (C-V2X), WAVE (IEEE 802.11p), IEEE 802.11bd, DSRC, ITS (including the European ITS-G5, ITS-GSB, ITS-GSC, etc.); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), etc.); Personal Digital Cellular (PDC); Personal Handy-phone System (PHS), Cellular Digital Packet Data (CDPD); CDPD; DataTAC; Digital Enhanced Cordless Telecommunications (DECT) (and variants thereof such as DECT Ultra Low Energy (DECT ULE), DECT-2020, DECT-5G, etc.); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The terms "beamforming" and "beam steering" at least in some embodiments refer to a spatial filtering mechanism used at a transmitter (Tx) to improve the received signal power, SNR, or some other signaling metric at an intended receiver (Rx). The term "beamformer" at least in some embodiments refers to a STA that transmits a physical layer PDU (PPDU) using a beamforming steering matrix. The term "beamforming steering matrix" at least in some embodiments refers to a matrix determined using knowledge of the channel between a Tx and an intended Rx that maps from space-time streams to transmit antennas with the goal of improving the signal power, SNR, and/or some other signaling metric at the intended Rx.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") at least in some embodiments refers to the ability of a network to carry out communication. The term "network reliability" at least in some embodiments refers to a probability or measure of delivering a specified amount of data from a source to a destination (or sink).

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link.

Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some embodiments refers to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computing" at least in some embodiments refers to computation resources that are geographically distributed within the vicinity of one or more localized networks' terminations.

The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused.

The term "microservice" at least in some embodiments refers to one or more processes that communicate over a network to fulfill a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier," "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems.

The term "Quality of Service" or "QoS" at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue.

The term "dequeue" at least in some embodiments refers to one or more operations of removing an element from the front of a queue.

The term "network coding" at least in some embodiments refers to a technique in which transmitted data is encoded and decoded to improve network performance.

The term "piggyback" or "piggybacking", in the context of computer communications and/or networking, refers to attaching, appending, or hooking a first data unit to a second data unit that is to be transmitted next or sometime before the first data unit; in this way, the first data unit gets a "free ride" in the data packet or frame carrying the second data unit.

The term "PDU Connectivity Service" at least in some embodiments refers to a service that provides exchange of PDUs between a UE and a data network (DN). The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD ADDR), a cellular network address (e.g., Access Point Name (APN), AMF identifier (ID), AF-Service-Identifier, Edge Application Server (EAS) ID, Data Network Access Identifier (DNAI), DNN, EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network-related identifiers), an email address, Enterprise Application Server (EAS) ID, an endpoint address, an Electronic Product Code (EPC) as defined by the EPCglobal Tag Data Standard, a Fully Qualified Domain Name (FQDN), an IP address in an IP network (e.g., IP version 4 (Ipv4), IP version 6 (IPv6), etc.), an internet packet exchange (IPX) address, LAN ID, a MAC address, PAN ID, a port number, Transmission Control Protocol (TCP) port number, UDP port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof.

The term "application identifier", "application ID", or "app ID" at least in some embodiments refers to an identifier that can be mapped to a specific application or application instance; in the context of 3GPP 5G/NR systems, an "application identifier" at least in some embodiments refers to an identifier that can be mapped to a specific application traffic detection rule.

The term "endpoint address" at least in some embodiments refers to an address used to determine the host/authority part of a target URI, where the target URI is used to access an NF service (e.g., to invoke service operations) of an NF service producer or for notifications to an NF service consumer.

The term "closed access group" or "CAG" at least in some embodiments refers to a group of list of users permitted to connect and/or access a specific network, a specific access network, and/or attach to a specific cell or network access node. CAGs are sometimes referred to as Access Control Lists (ACLs), Closed Subscriber Groups (CSGs), Closed User Groups (CUGs), and the like. The term "CAG-ID" at least in some embodiments refers to an identifier of a CAG.

The term "port" in the context of computer networks, at least in some embodiments refers to a communication endpoint, a virtual data connection between two or more entities, and/or a virtual point where network connections start and end. Additionally or alternatively, a "port" at least in some embodiments is associated with a specific process or service.

The term "subnetwork" or "subnet" at least in some embodiments refers to a logical subdivision of a network, such as an IP network. The practice of dividing a network into two or more networks is called "subnetting."

The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "localized network" at least in some embodiments refers to a local network that covers a limited number of connected vehicles in a certain area or region.

The term "local data integration platform" at least in some embodiments refers to a platform, device, system, network, or element(s) that integrate local data by utilizing a combination of localized network(s) and distributed computation.

The term "basic service set" or "BSS" at least in some embodiments refers to a set of STAs that have successfully synchronized using a join service primitives and one STA that has used the START primitive. Alternatively, a set of STAs that have used a start primitive specifying matching mesh profiles where the match of the mesh profiles has been verified via the scanning procedure. Membership in a BSS does not imply that wireless communication with all other members of the BSS is possible.

The term "clear channel assessment (CCA) function" at least in some embodiments refers to a logical function in the physical layer (PHY) that determines the current state of use of a wireless medium.

The term "coordination function" at least in some embodiments refers to a logical function that determines when a STA is permitted to transmit PDUs via a WM.

The term "distributed coordination function" or "DCF" at least in some embodiments refers to a class of coordination function(s) where the same coordination function logic is active in every STA in a BSS whenever the network is in operation.

The term "distribution service" at least in some embodiments refers to a service that, by using association information, delivers MAC service tuples within a distribution system (DS).

The term "distribution system" or DS" at least in some embodiments refers to a system used to interconnect a set of BSSs and integrated LANs to create an extended service set (ESS).

The term "Geo-Area" at least in some embodiments refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter α which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter α which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x, y) assumes the canonical form of the geometric shapes: The Cartesian coordinate system has its origin in the center of the shape. Its abscissa is parallel to the long side of the shapes. Point P is defined relative to this coordinate system.

The term "ITS data dictionary" at least in some embodiments refers to a repository of DEs and DFs used in the ITS applications and ITS facilities layer.

The term "ITS message" at least in some embodiments refers to messages exchanged at ITS facilities layer among ITS-stations or messages exchanged at ITS applications layer among ITS-stations.

The term "Collective Perception" or "CP" at least in some embodiments refers to the concept of sharing the perceived environment of an ITS-S based on perception sensors, wherein an ITS-S broadcasts information about its current (driving) environment. CP at least in some embodiments refers to the concept of actively exchanging locally perceived objects between different ITS-Ss by means of a V2X RAT. CP decreases the ambient uncertainty of ITS-Ss by contributing information to their mutual FoVs.

The term "Collective Perception basic service", "CP service", or CPS" at least in some embodiments refers to a facility at the ITS-S facilities layer to receive and process CPMs, and generate and transmit CPMs.

The term "Collective Perception Message" or "CPM" at least in some embodiments refers to a CP basic service PDU.

The term "Collective Perception data" or "CPM data" at least in some embodiments refers to a partial or complete CPM payload.

The term "Collective Perception protocol" or "CPM protocol" at least in some embodiments refers to an ITS facilities layer protocol for the operation of the CPM generation, transmission, and reception.

The term "CP object" or "CPM object" at least in some embodiments refers to aggregated and interpreted abstract information gathered by perception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference. The term "Environment Model" refers to a current representation of the immediate environment of an ITS-S, including all perceived objects perceived by either local perception sensors or received by V2X. The term "object", in the context of the CP Basic Service, refers to the state space representation of a physically detected object within a sensor's perception range. The term "object list" refers to a collection of objects temporally aligned to the same timestamp.

The term "ITS Central System" refers to an ITS system in the backend, for example, traffic control center, traffic management center, or cloud system from road authorities, ITS application suppliers or automotive OEMs.

The term "personal ITS-S" refers to an ITS-S in a nomadic ITS sub-system in the context of a portable device (e.g., a mobile device of a pedestrian).

The term "vehicle" may refer to road vehicle designed to carry people or cargo on public roads and highways such as AVs, busses, cars, trucks, vans, motor homes, and motorcycles; by water such as boats, ships, etc.; or in the air such as airplanes, helicopters, UAVs, satellites, etc.

The term "sensor measurement" refers to abstract object descriptions generated or provided by feature extraction algorithm(s), which may be based on the measurement principle of a local perception sensor mounted to a station/UE, wherein a feature extraction algorithm processes a sensor's raw data (e.g., reflection images, camera images, etc.) to generate an object description.

The term "State Space Representation" is a mathematical description of a detected object, which includes state variables such as distance, speed, object dimensions, and the like. The state variables associated with/to an object are interpreted as an observation for a certain point in time, and therefore, are accompanied by a time reference.

The term "maneuvers" or "manoeuvres" refer to specific and recognized movements bringing an actor, e.g., pedestrian, vehicle or any other form of transport, from one position to another within some momentum (velocity, velocity variations and vehicle mass). The term "Maneuver Coordination" or "MC" refers to the concept of sharing, by means of a V2X RAT, an intended movement or series of intended movements of an ITS-S based on perception sensors, planned trajectories, and the like, wherein an ITS-S broadcasts information about its current intended maneuvers. The term "Maneuver Coordination basic service" (also referred to as MCS) refers to a facility at the ITS-S facilities layer to receive and process MCMs, and generate and transmit MCMs. The term "Maneuver Coordination Message" or "MCM" refers to an MC basic service PDU. The term "Maneuver Coordination data" or "MCM data" refers to a partial or complete MCM payload. The term "Maneuver Coordination protocol" or "MCM protocol" refers to an ITS facilities layer protocol for the operation of the MCM generation, transmission, and reception. The term "MC object" or "MCM object" refers to aggregated and interpreted abstract information gathered by perception sensors about other traffic participants and obstacles, as well as information from applications and/or services operated or consumed by an ITS-S.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "algorithm" at least in some embodiments refers to an unambiguous specification of how to solve a problem or a class of problems by performing calculations, input/output operations, data processing, automated reasoning tasks, and/or the like.

The terms "instantiate," "instantiation," and the like at least in some embodiments refers to the creation of an instance. An "instance" also at least in some embodiments refers to a concrete occurrence of an object, which may occur, for example, during execution of program code.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "software agent" at least in some embodiments refers to a computer program that acts for a user or other program in a relationship of agency.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit", a "protocol data unit" or "PDU", a "service data unit" or "SDU", a frame, a packet, and/or the like.

The term "information element" at least in some embodiments refers to a structural element containing one or more fields.

The term "field" at least in some embodiments refers to individual contents of an information element, or a data element that contains content.

The term "data frame" or "DF" at least in some embodiments refers to a data type that contains more than one data element in a predefined order.

The term "data element" or "DE" at least in some embodiments refers to a data type that contains one single data. Additionally or alternatively, the term "data element" at least in some embodiments refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some embodiments refers to a data type that contains one single data. Data elements may store data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" at least in some embodiments refers to a markup construct including a name-value pair that exists within a start tag or empty element tag. Attributes contain data related to its element and/or control the element's behavior.

The term "reference" at least in some embodiments refers to data usable to locate other data and may be implemented a variety of ways (e.g., a pointer, an index, a handle, a key, an identifier, a hyperlink, etc.).

The term "stream" or "streaming" refers to a manner of processing in which an object is not represented by a complete logical data structure of nodes occupying memory proportional to a size of that object, but are processed "on the fly" as a sequence of events.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/ throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An intelligent transportation system (ITS)-station (ITS-S) comprising:

one or more processors; and one or more non-transitory computer-readable media comprising instructions that, upon execution of the instructions by the one or more processors, are to cause a facilities layer (FAC) entity to:

identify, based on a radio access technology (RAT)-related indication received from a cross-layer management (CROSS) entity, an available channel busy ratio (CBR) percentage per radio channel of a wireless connection between the ITS-S and another ITS entity, wherein the RAT-related indication includes context-related information of a RAT on which the respective messages are to be transmitted;

identify a freshness factor related to respective messages that are to be transmitted on a wireless connection by the ITS-S;

calculate, based on the CBR and the freshness factor, a minimum inter-message interval for respective applications and respective traffic classes of the wireless connection; and provide, to the CROSS entity, an indication of the minimum inter-message intervals for the respective applications and respective traffic classes.

2. The ITS-S of claim 1, wherein the context-related information includes position, speed, or heading of nodes within a vicinity of the ITS-S that are configured to communicate on the RAT.

3. The ITS-S of claim 1, wherein the CROSS entity is to identify, based on the indication of the minimum inter-message intervals for the respective applications and respective traffic classes, a channel resource limit (CRL) for a channel of the wireless connection.

4. The ITS-S of claim 3, wherein the CROSS entity is further to allocate, for a channel related to the CRL, a proportion of an available channel resource (CR) for transmission of the respective messages.

5. The ITS-S of claim 3, wherein the channel is a first channel, and wherein the CROSS entity is further to identify, based on the indication of the minimum inter-message intervals for the respective applications and respective traffic classes, a second CRL for a second channel of the wireless connection.

6. The ITS-S of claim 1, wherein the freshness factor is a freshness of information parameter or a remaining lifetime of information (RLoI) parameter.

7. The ITS-S of claim 6, wherein the freshness factor further includes a weight applied to the freshness of information parameter or a weight applied to the RLoI parameter.

8. The ITS-S of claim 1, wherein the CROSS entity is a multi-channel operation (MCO) CROSS (MCO_CROSS) entity or a decentralized congestion control (DCC) CROSS (DCC_CROSS) entity.

9. The ITS-S of claim 1, wherein the FAC entity is a multi-channel operation (MCO) FAC (MCO_FAC) entity or a decentralized congestion control (DCC) FAC (DCC_FAC) entity.

10. One or more non-transitory computer-readable media (NTCRM) comprising instructions for operating a cross-layer management (CROSS) entity of an intelligent transportation system (ITS)-station (ITS-S), wherein execution of the instructions by one or more processors of the ITS-S is to cause the ITS-S to operate the CROSS entity to:

send a radio access technology (RAT)-related indicator to a facilities layer (FAC) entity, the RAT-related indicator for identification of an available channel busy ratio (CBR) percentage per radio channel of a wireless connection between the ITS-S and another ITS entity, wherein the RAT-related indication includes context-related information of a RAT on which the respective messages are to be transmitted;

receive, from the FAC entity, an inter-message interval indicator that includes respective minimum inter-message intervals for corresponding applications and corresponding traffic classes, wherein the respective minimum inter-message intervals are based on the CBR and a freshness factor related to respective messages that are to be transmitted on a wireless connection by the ITS-S.

11. The one or more NTCRM of claim 10, wherein the context-related information includes position, speed, or heading of nodes within a vicinity of the ITS-S that are configured to communicate on the RAT.

12. The one or more NTCRM of claim 10, wherein execution of the instructions is to cause the ITS-S to operate the CROSS entity to:

identify a first channel resource limit (CRL) for a first channel of the wireless connection based on the inter-message interval indicator for the respective applications and respective traffic classes;

identify a second CRL for a second channel of the wireless connection based on the inter-message interval indicator for the respective applications and respective traffic classes; and allocate, for the first channel or the second channel, a proportion of an available channel resource (CR) for transmission of the respective messages.

13. The one or more NTCRM of claim 10, wherein the freshness factor further includes a weight applied to a freshness of an information parameter or a weight applied to a remaining lifetime of information (RLoI) parameter.

14. The one or more NTCRM of claim 10, wherein the CROSS entity is a multi-channel operation (MCO) CROSS (MCO_CROSS) entity or a decentralized congestion control (DCC) CROSS (DCC_CROSS) entity, and the FAC entity is a multi-channel operation (MCO) FAC (MCO_FAC) entity or a decentralized congestion control (DCC) FAC (DCC_FAC) entity.

* * * * *